United States Patent
Kira et al.

(10) Patent No.: US 11,955,917 B2
(45) Date of Patent: Apr. 9, 2024

(54) MOTOR CONTROL SYSTEM, MOTOR CONTROL APPARATUS, AND MOTOR CONTROL METHOD

(71) Applicant: KABUSHIKI KAISHA YASKAWA DENKI, Kitakyushu (JP)

(72) Inventors: Toshinobu Kira, Kitakyushu (JP); Tadashi Okubo, Kitakyushu (JP); Isamu Matsumura, Kitakyushu (JP); Ryo Ota, Kitakyushu (JP); Yu Katono, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 0 days.

(21) Appl. No.: 17/938,950

(22) Filed: Sep. 7, 2022

(65) Prior Publication Data
US 2023/0110855 A1    Apr. 13, 2023

(30) Foreign Application Priority Data
Oct. 7, 2021    (JP) ................... 2021-165769

(51) Int. Cl.
*G05B 11/32* (2006.01)
*H02P 5/50* (2016.01)
*H02P 6/04* (2016.01)

(52) U.S. Cl.
CPC . *H02P 5/50* (2013.01); *H02P 6/04* (2013.01)

(58) Field of Classification Search
CPC ...... H02P 5/50; H02P 6/04; H02P 6/16; H02P 5/00
See application file for complete search history.

(56) References Cited

U.S. PATENT DOCUMENTS
2021/0191369 A1    6/2021    Matsumura

FOREIGN PATENT DOCUMENTS

| CN | 105871262 B | * | 6/2020 | ............... G05D 3/12 |
| JP | 2021-100350 | | 7/2021 | |
| WO | WO2020/195552 | | 10/2020 | |

OTHER PUBLICATIONS

Japanese Office Action for corresponding JP Application No. 2021-165769, Jul. 6, 2023 (w/ machine translation).

* cited by examiner

*Primary Examiner* — Karen Masih
(74) *Attorney, Agent, or Firm* — MORI & WARD, LLP

(57) ABSTRACT

A motor control system includes host control circuitry configured to generate a first control command; a plurality of motor control apparatuses configured to control a plurality of motors, respectively, based on the first control command; and reference information output circuitry configured to output reference information to one of the plurality of motor control apparatuses which is configured to control one of the plurality of motors. The reference information relates to control of the plurality of motors. Each of the plurality of motor control apparatuses corresponds to a corresponding motor among the plurality of motors and includes information sharing circuitry configured to share the reference information among the plurality of motor control apparatuses via data communication; command conversion circuitry configured to convert the reference information into a second control command; and motor control circuitry configured to control the corresponding motor based on the second control command.

16 Claims, 13 Drawing Sheets

MOTOR CONTROL SYSTEM, MOTOR CONTROL APPARATUS, AND MOTOR CONTROL METHOD

CROSS-REFERENCE TO RELATED APPLICATIONS

The present application claims priority under 35 U. S. C. § 119 to Japanese Patent Application No. 2021-165769, filed Oct. 7, 2021. The contents of this application are incorporated herein by reference in their entirety.

BACKGROUND OF THE INVENTION

Field of the Invention

Disclosed embodiments relate to a motor control system, a motor control apparatus, and a motor control method.

Discussion of the Background

Japanese Unexamined Patent Publication No. 2021-100350 discloses a distributed motor control system. The distributed motor control system includes a sharing processing unit and a control unit. The sharing processing unit performs sharing processing for each of at least two servo amplifiers among a plurality of servo amplifiers which are connected to a host control device to share cooperative control data required for cooperative driving of industrial equipment with each other via data communication between the at least two servo amplifiers. The control unit controls a corresponding motor using the cooperative control data subjected to the sharing processing.

SUMMARY OF THE INVENTION

According to one aspect of the present invention, a motor control system includes host control circuitry configured to generate a first control command; a plurality of motor control apparatuses configured to control a plurality of motors, respectively, based on the first control command; and reference information output circuitry configured to output reference information to one of the plurality of motor control apparatuses which is configured to control one of the plurality of motors. The reference information relates to control of the plurality of motors. Each of the plurality of motor control apparatuses corresponds to a corresponding motor among the plurality of motors and includes information sharing circuitry configured to share the reference information among the plurality of motor control apparatuses via data communication; command conversion circuitry configured to convert the reference information into a second control command; and motor control circuitry configured to control the corresponding motor based on the second control command.

According to another aspect of the present invention, a motor control system includes host control circuitry configured to generate a control command; a plurality of motor control apparatuses configured to control a plurality of motors, respectively, based on the control command; and a plurality of sensors each of which is configured to detect position information of a movable part of each of the plurality of motors to output the position information to each of the plurality of motor control apparatuses. Each of the plurality of motor control apparatuses includes information sharing circuitry configured to share the position information among the plurality of motor control apparatuses via data communication. At least one of the plurality of motor control apparatuses includes reaching determination circuitry configured to determine whether a reference point of a drive machine driven by the plurality of motors reaches a predetermined position based on the position information; and a trigger output circuitry configured to output a trigger signal when it is determined that the reference point has reached the predetermined position.

According to further aspect of the present invention, a motor control system includes host control circuitry configured to generate a control command; a plurality of motor control apparatuses configured to control a plurality of motors, respectively, based on the control command; and at least one sensor configured to detect position information of a movable part of at least one motor among the plurality of motors and output the position information to a corresponding motor control apparatus among the plurality of motor control apparatuses. Each of the plurality of motor control apparatuses includes information sharing circuitry configured to share the position information among the plurality of motor control apparatuses via data communication. At least one of the plurality of motor control apparatuses includes parameter adjustment circuitry configured to adjust control parameters relating to control of a corresponding motor among the plurality of the motors; and motor control circuitry configured to control the corresponding motor based on the control command and the adjusted control parameter.

According to the other aspect of the present invention, a motor control apparatus is configured to control one of a plurality of motors based on a first control command output from host control circuitry. The motor control apparatus includes information sharing circuitry configured to share reference information with another motor control apparatus via data communication, the reference information relating to control of the plurality of motors; command conversion circuitry configured to convert the reference information into a second control command; and motor control circuitry configured to control a corresponding motor among the plurality of motors based on the second control command.

According to the other aspect of the present invention, a motor control apparatus is configured to control one of a plurality of motors based on a control command output from host control circuitry. The motor control apparatus includes information sharing circuitry configured to share position information with another motor control apparatus via data communication, the position information being detected by a sensor which is configured to detect the position information of a movable part of another motor among the plurality of motors and to output the position information to the another motor control apparatus; reaching determination circuitry configured to determine whether a reference point of a drive machine driven by the plurality of motors reaches a predetermined position based on the position information; and trigger output circuitry configured to output a trigger signal when it is determined that the reference point has reached the predetermined position.

According to the other aspect of the present invention, a motor control apparatus is configured to control a motor among a plurality of motors based on a control command output from host control circuitry. The motor control apparatus includes information sharing circuitry configured to share position information with another motor control apparatus via data communication, the position information being detected by a sensor which is configured to detect the position information of a movable part of another motor among the plurality of motors and to output the position information to the another motor control apparatus; parameter adjustment circuitry configured to adjust, based on the position information, control parameters relating to control of the motor; and motor control circuitry configured to control the motor based on the control command and the control parameters adjusted by the parameter adjustment circuitry.

According to the other aspect of the present invention, a motor control method is for controlling a plurality of motors based on a first control command output from host control circuitry. The motor control method includes sharing reference information, via data communication, among a plurality of motor control apparatuses which are configured to control the plurality of motors, respectively, the reference information relating to control of the plurality of motors; converting the reference information into a second control command for a motor among the plurality of motors; and controlling the motor based on the second control command.

According to the other aspect of the present invention, a motor control method is for controlling a motor among a plurality of motors based on a control command output from host control circuitry. The motor control method includes detecting position information of a movable part of another motor among the plurality of motors; outputting the position information to another motor control apparatus which is configured to control the another motor; sharing the position information, via data communication, with a motor control apparatus which is configured to control the motor; determining whether a reference point of a drive machine driven by the plurality of motors reaches a predetermined position based on the position information; and outputting a trigger signal when it is determined that the reference point has reached the predetermined position.

According to the other aspect of the present invention, a motor control method is for controlling a motor among a plurality of motors based on a control command output from host control circuitry. The motor control method includes detecting position information of a movable part of another motor among the plurality of motors; outputting the position information to another motor control apparatus which is configured to control the another motor; sharing the position information, via data communication, with a motor control apparatus which is configured to control the motor; adjusting, based on the position information, control parameters relating to control of the motor; and controlling the motor based on the control command and the control parameters adjusted.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

Embodiments will be described below with reference to the drawings.

1. First Embodiment

The first embodiment is an embodiment in the case where the motor control system 1 is applied to a system in which the motor control system 1 is independently operated using a reference signal.

(1-1. Overall Configuration of Motor Control System)

An example of the overall configuration of a motor control system according to the first embodiment will be described with reference to FIG. 1.

Figure 1:
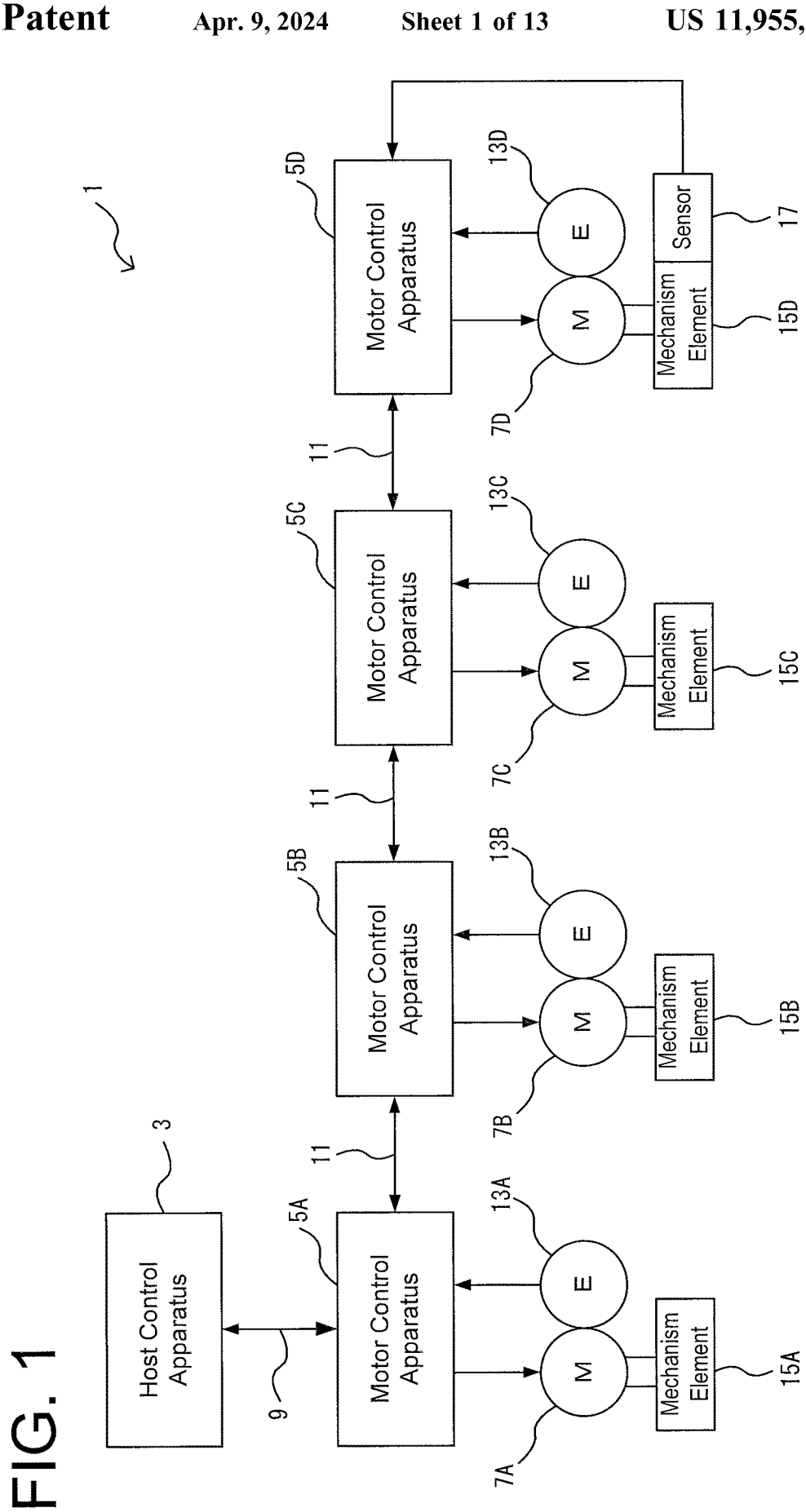
FIG. 1 is a diagram showing an example of the overall configuration of a motor control system according to a first embodiment.

As shown in FIG. 1, the motor control system 1 includes a host control apparatus (an example of "host control circuitry") 3, a plurality of (e.g., four) motor control apparatuses 5A to 5D, and a plurality of (e.g., four) motors 7A to 7D.

The host control apparatus 3 is constituted by a computer such as a general-purpose personal computer, a PLC (Programmable logic controller), and a motion controller, for example. The host control apparatus 3 executes control commands (an example of a first control command) for controlling the motors 7A to 7D. For example, a position command, a speed command, a torque command, etc.) are respectively generated and transmitted to the motor control apparatuses 5A to 5D, respectively.

The motor control apparatuses 5A to 5D control the motors 7A to 7D, respectively, based on the control command received from the host control apparatus 3. The motors 7A to 7D may be rotary motors or linear motors. The motor control apparatuses 5A to 5D are also referred to as servo amplifiers. The motor control apparatuses 5A to 5D are connected in series with the host control apparatus 3, and can perform data communication with each other. Further, a specific one of the motor control apparatuses 5A to 5D (for example, the motor control apparatus 5A) is connected to the host control apparatus 3 so as to be capable of data communication with each other. Hereinafter, a communication path for performing data communication between the host control apparatus 3 and the motor control apparatus 5A is referred to as a first communication path 9, and a communication path for performing data communication between the motor control apparatuses 5A to 5D is referred to as a second communication path 11.

The motor control apparatus 5A supplies electric power to the motor 7A based on the control command received from the host control apparatus 3 and the position information received from the encoder 13A, thereby controlling the motor 7A. The motor 7A drives the mechanism element 15A. The encoder 13A detects the position information of the movable part (for example, a rotor or a movable element) of the motor 7A and transmits it to the motor control apparatus 5A.

The motor control apparatus 5B controls the motor 7B by supplying electric power to the motor 7B based on the control command received from the host control apparatus 3 and the position information received from the encoder 13B. The motor 7B drives the mechanism element 15B. The encoder 13B detects the position information of the movable part of the motor 7B and transmits it to the motor control apparatus 5B.

The motor control apparatus 5C controls the motor 7C by supplying electric power to the motor 7C based on the control command received from the host control apparatus 3 and the position information received from the encoder 13C. The motor 7C drives the mechanism element 15C. The encoder 13C detects the position information of the movable part of the motor 7C and transmits it to the motor control apparatus 5C.

The motor control apparatus 5D controls the motor 7D by supplying electric power to the motor 7D based on the control command received from the host control apparatus 3 and the position information received from the encoder 13D. The motor 7D drives the mechanism element 15D. The encoder 13D detects the position information of the movable part of the motor 7D and transmits it to the motor control apparatus 5D.

A specific one of the motor control apparatuses 5A to 5D (for example, the motor control apparatus 5D) receives the reference information related to the control of the motor. The type of the "reference information" is not particularly limited as long as it has a correlation with the control commands for the respective motors 7A to 7D and can be converted into the respective control commands using the correlation information. For example, the external sensor 17 (an example of the reference information output unit) for detecting the position information of the mechanism element 15D (an example of the movable part) driven by the motor 7D may be installed, and the motor control apparatus 5D may receive the position information (an example of the reference information) detected by the external sensor 17 as the reference information. The reference information received by the motor control apparatus 5D is shared among the motor control apparatuses 5A to 5D, and is used for execution of self-sustained operation by the motor control apparatuses 5A to 5D independent of the host control apparatus 3.

The type of the external sensor 17 is not particularly limited as long as it can detect the position information and the like of the mechanism element 15. For example, an encoder, a potentiometer, an infrared sensor, a laser sensor, or the like may be used. When detecting the speed information or the torque information of the mechanism element 15 as the reference information, the external sensor 17 may be, for example, a speed sensor or a torque sensor. Instead of the information detected by the external sensor 17, the position information of the movable part of the motor 7D output from the encoder 13D may be used as the reference information. In this case, the encoder 13D is an example of the reference information output unit.

The mechanical elements 15A to 15D constitute, for example, an industrial mechanical system for performing predetermined processing such as machining and measurement on a workpiece. Although the type of each mechanical element is not particularly limited, for example, when the motor 7 is of a rotary type, a ball screw mechanism or the like may be used.

It should be noted that the configuration of the motor control system 1 described above is an example, and is not limited to the above contents. For example, the number (number of axes) of the motor control apparatus 5 and the motor 7 may be a plurality other than four, or any one of the motor control apparatuses 5B to 5D may be connected to the host control apparatus 3. Further, any one of the motor control apparatuses 5A to 5C may receive the reference information.

In the present embodiment, when motor control apparatuses 5A to 5D, motors 7A to 7D, encoders 13A to 13D, and mechanical elements 15A to 15D are not distinguished from each other, they are described as motor control apparatus 5, motor 7, encoder 13, and mechanical element 15.

(1-2. Functional Configuration of Host Control Apparatus and Motor Control Apparatus)

Figure 2:
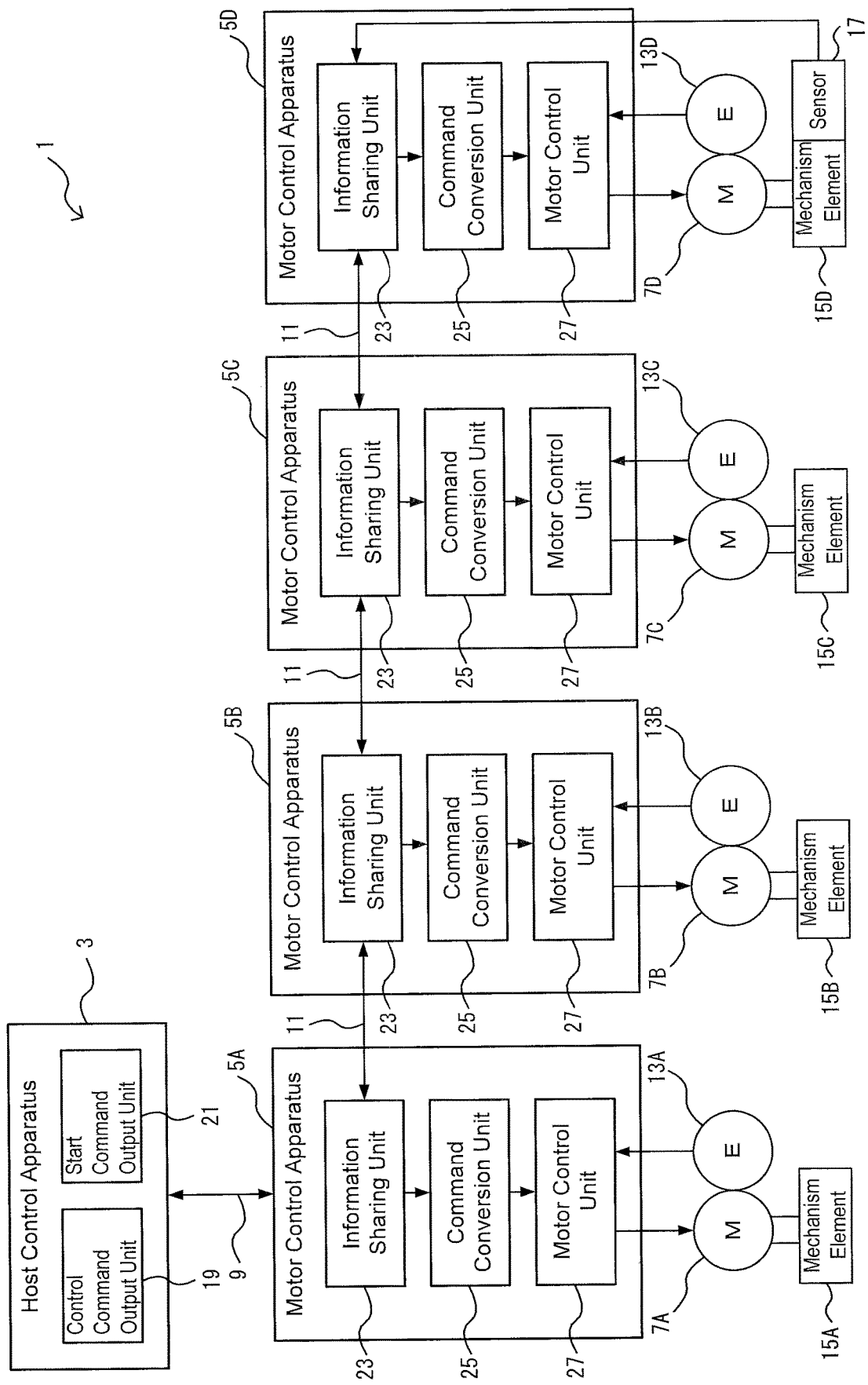
FIG. 2 is a block diagram showing an example of a functional configuration of a host control apparatus and a motor control apparatus.
Figure 3:
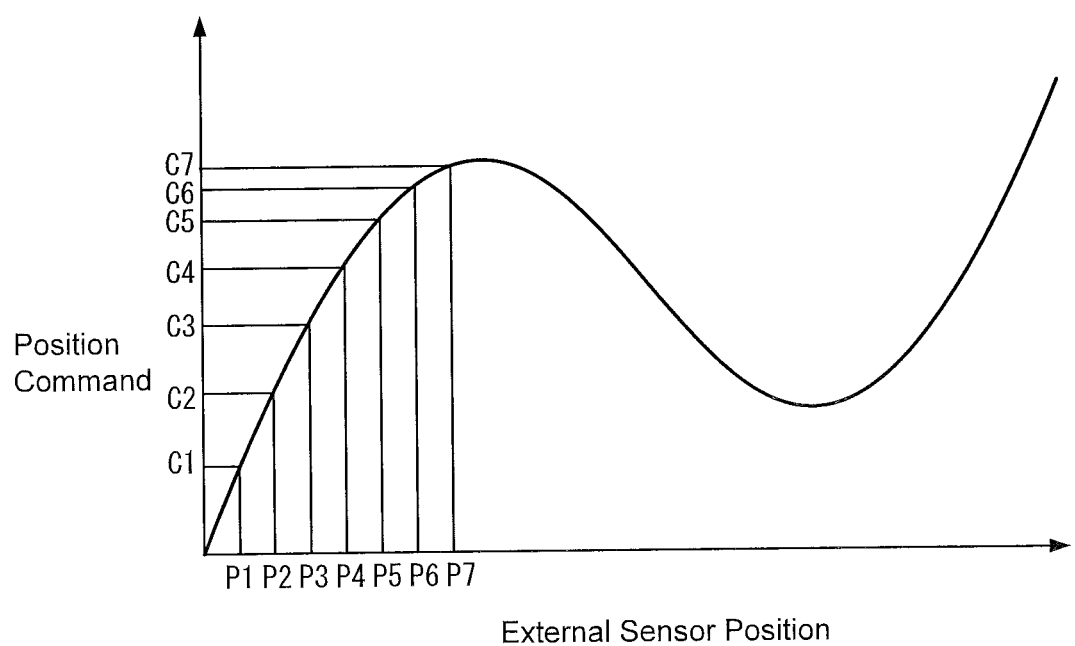
FIG. 3 is a diagram showing an example of correlation information between position information detected by an external sensor and a position command for a motor.

Referring to FIGS. 2 and 3, an example of the functional configuration of the host control apparatus 3 and the motor control apparatuses 5A to 5D will be described.

As shown in FIG. 2, the host control apparatus 3 includes a control command output unit 19 and a start command output unit (an example of "start command output circuitry") 21. The control command output unit 19 generates a control command (for example, a position command, a speed command, a torque command, etc.) for controlling the operation of each of the motors 7A to 7D, and transmits it to the corresponding motor control apparatuses 5A to 5D, respectively. Since the motor control apparatuses 5A to 5D are connected in series as described above, a control command to the motor control apparatus 5A is transmitted via the first communication path 9, and a control command to the motor control apparatuses 5B to 5D is transmitted via the first communication path 9 and the second communication path 11.

The start command output unit 21 outputs a start command to the motor control apparatuses 5A to 5D at a predetermined timing. The "start command" is a command for instructing the start of self-sustained operation by the motor control apparatuses 5A to 5D not depending on the host control apparatus 3. The start command transmitted from the host control apparatus 3 to the motor control apparatus 5A is transmitted to each of the motor control apparatuses 5B to 5D via the second communication path 11.

Each of the motor control apparatuses 5A to 5D includes an information sharing unit (an example of "information sharing circuitry") 23, a command conversion unit (an example of "command conversion circuitry") 25, and a motor control unit (an example of "motor control circuitry") 27. The information sharing unit 23 shares the reference information (in this embodiment, the position information of the mechanism element 15D received by the motor control apparatus 5D from the external sensor 17) with each other between the motor control apparatuses 5A to 5D via data communication via the second communication path 11. Specifically, the information sharing unit 23 of the motor control apparatus 5D shares the position information received from the external sensor 17 and transmits the position information to the information sharing units 23 of the motor control apparatuses 5A to 5C via the second communication path 11. The shared position information is also transmitted to the host control apparatus 3 via the first communication path 9.

The command conversion unit 25 converts the reference information shared by the information sharing unit 23 into a control command (an example of a second control command) corresponding to the motor 7 which is a control target. For example, the command conversion unit 25 converts the position information into a position command based on the correlation information between the position information detected by the external sensor 17 and the position command corresponding to the motor 7 to be controlled.

Specifically, the command conversion unit 25 of the motor control apparatus 5A converts the shared position information into a position command for the motor 7A based on correlation information between the position information detected by the external sensor 17 and the position command for the motor 7A, which is recorded in an appropriate recording means of the motor control apparatus 5A. Similarly, the command conversion unit 25 of the motor control apparatus 5B converts the shared position information into a control command for the motor 7B based on the correlation information between the position information detected by the external sensor 17 and the position command for the motor 7B, which is recorded in an appropriate recording means of the motor control apparatus 5B. Similarly, the command conversion unit 25 of the motor control apparatus 5C converts the shared position information into a control command for the motor 7C based on the correlation information between the position information detected by the external sensor 17 and the position command for the motor 7C, which is recorded in an appropriate recording means of the motor control apparatus 5C. Similarly, the command conversion unit 25 of the motor control apparatus 5D converts the shared position information into a control command for the motor 7D based on the correlation information between the position information detected by the external sensor 17 and the position command for the motor 7D, which is recorded in an appropriate recording means of the motor control apparatus 5D.

FIG. 3 shows an example of the correlation information between the position information detected by the external sensor 17 and the position command for the motor 7. As shown in FIG. 3, the correlation information defines position commands C1, C2, C3 . . . respectively corresponding to the position information P1, P2, P3 . . . detected by the external sensor 17. The correlation information is also called an electronic cam table. In each of the motor control apparatuses 5A to 5D, unique correlation information corresponding to the motor 7 to be controlled is recorded. The command conversion unit 25 of each of the motor control apparatuses 5A to 5D converts the shared position information into unique position commands based on the correlation information.

The control command converted from the reference information by the command conversion unit 25 is not limited to the position command, but may be, for example, a speed command or a torque command. In this case, corresponding correlation information may be recorded in each motor control apparatus 5 in advance.

The motor control unit 27 controls the motor 7 to be controlled based on the control command converted by the command conversion unit 25 and the position information received from the corresponding encoder 13. More specifically, the motor control unit 27 includes, for example, a position control unit, a speed control unit, and a current control unit (not illustrated). The position control unit generates a speed command by, for example, PID control or the like based on a position deviation obtained by subtracting a feedback position based on the detection information of the encoder 13 from the position command converted by the command conversion unit 25. The speed control unit generates a torque command by, for example, PID control or the like based on a speed deviation obtained by subtracting a feedback speed based on information detected by the encoder 13 from the speed command. The current control unit performs power conversion based on the torque command and supplies power to the motor 7.

The processes in the control command output unit 19 and the start command output unit 21 of the host control apparatus 3 and the processes in the information sharing unit 23, the command conversion unit 25, and the motor control unit 27 of the motor control apparatuses 5A to 5D are not limited to the examples of sharing of these processes. For example, the processing may be performed by a smaller number of processing units (for example, one processing unit), or may be performed by further subdivided processing units. In the motor control apparatuses 5A to 5D, only a portion (an inverter or the like) for supplying electric power to the motors 7A to 7D is mounted by an actual device, and the other functions of each processing unit may be mounted by a program executed by a CPU901 (see FIG. 13) described later, or a part or all of the functions may be mounted by an actual device such as an ASIC, an FPGA, or other electric circuit.

(1-3. Processing Procedure of Motor Control Apparatus)

Figure 4:
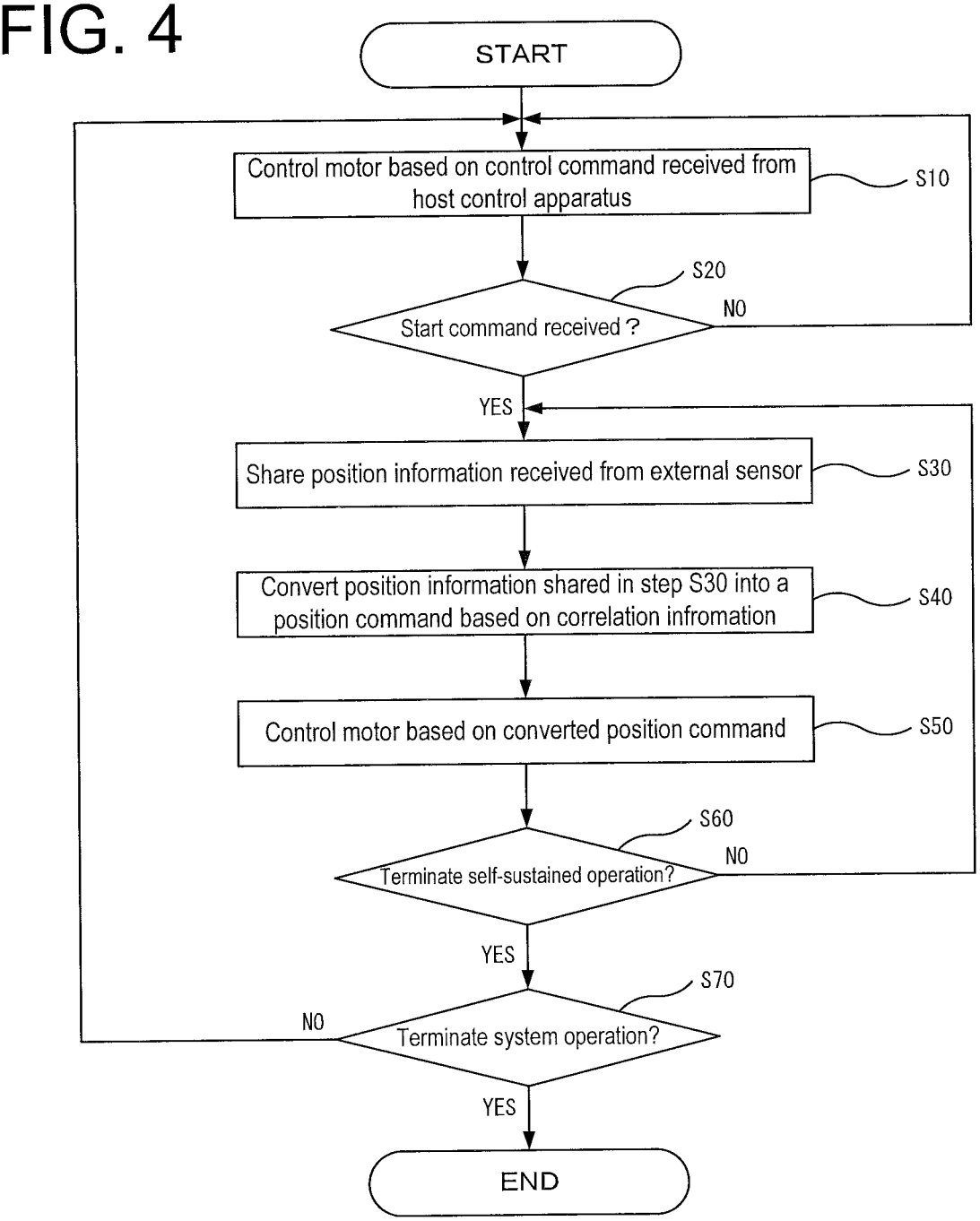
FIG. 4 is a flowchart showing an example of a processing procedure executed by the motor control apparatus 5A.

Referring to FIG. 4, an example of a processing procedure executed by the motor control apparatus 5 will be described.

In step S10, the motor control apparatus 5 controls the motor 7 to be controlled by the motor control apparatus 27 based on the control command received from the host control apparatus 3 and the position information received from the corresponding encoder 13.

In step S20, the motor control apparatus 5 determines whether or not a start command has been received from the host control apparatus 3. If the start command has not been received (step S20: NO), the process returns to step S10. On the other hand, when the start command is received (step S20: YES), the process proceeds to the next step S30.

In step S30, the motor control apparatus 5 shares the position information of the mechanical element 15D received by the motor control apparatus 5D from the external sensor 17 with the motor control apparatuses 5A to 5D through data communication via the second communication path 11 by the information sharing unit 23.

In step S40, the motor control apparatus 5 uses the command conversion unit 25 to convert the position information shared in step S30 into a position command corresponding to the motor 7 to be controlled based on the correlation information recorded in the recording means.

In step S50, the motor control apparatus 5 controls the motor 7 to be controlled by the motor control unit 27 based on the position command converted in step S40 and the position information received from the corresponding encoder 13. As a result, the motor control apparatuses 5A-5D control the respective motors 7A-7D on the basis of the position information received from the encoder 13, even if there is no control command from the host control apparatus 3, and the motor control apparatuses 5A-5D perform self-sustained operation.

In step S60, the motor control apparatus 5 determines whether or not to terminate the self-sustained operation. The termination of the self-sustained operation is determined by, for example, whether or not a termination command instructing the termination of the self-sustained operation has been received from the host control apparatus 3, or whether or not the delivery of the position command converted based on the correlation information has been completed. If the self-sustained operation is not terminated (step S60: NO), the process returns to step S30. On the other hand, when the self-sustained operation is to be terminated (step S60: YES), the process proceeds to step S70.

In step S70, the motor control apparatus 5 determines whether or not to terminate the operation of the motor control system 1. If the operation of the system is to be continued (step S70: NO), the process returns to step S10, and the same procedure is repeated. On the other hand, when the operation of the system is to be terminated (step S70: YES), the present flowchart is terminated.

The processing procedure described above is an example, and at least a part of the above procedure may be deleted or changed, or other procedures may be added. Further, the order of at least a part of the above-described procedures may be changed, or a plurality of procedures may be combined into a single procedure.

(1-4. Effects of First Embodiment)

As described above, a motor control system 1 of a first embodiment includes a host control apparatus 3 which outputs a control command, a plurality of motor control apparatuses 5A-5D which control a plurality of motors 7A-7D based on the control command, and an external sensor 17 which outputs reference information relating to the control of the motor 7 to any one of the motor control apparatuses 5, for example, the motor control apparatus 5D), and each of the plurality of motor control apparatuses 5A-5D has an information sharing unit 23 which shares the reference information with each other via data communication between the plurality of motor control apparatuses 5A-5D, a command conversion unit 25 which converts the shared reference information into a control command corresponding to the motor 7 which is a control target, and a motor control unit 27 which controls the motor 7 which is a control target based on the converted control command.

In a motor control system 1, each of a plurality of motor control apparatuses 5A-5D shares reference information with each other through data communication, converts the shared reference information into a control command for self-sustained operation, and controls a motor 7 based on the control command. In this way, each of the motor control apparatuses 5A to 5D can independently operate without receiving a control command from the host control apparatus 3. This eliminates the need for the host control apparatus 3 to generate and output control commands for the motor control apparatuses 5A to 5D, thereby reducing the processing load on the host control apparatus 3.

Further, when a plurality of motor control apparatuses 5A to 5D are operated in synchronization with a control command from the host control apparatus 3, the command resolution is determined by the processing cycle of the host control apparatus 3. For example, when the number of motor control apparatus to be controlled (the number of connection axes) is large or there is processing for motor control apparatus unrelated to synchronization, the processing load of the host control apparatus 3 increases and the processing period becomes longer. As a result, the command resolution becomes coarse, and there is a possibility that the synchronization accuracy is reduced.

In this embodiment, self-sustained operation is performed based on the reference information shared by the motor control apparatuses 5A to 5D through data communication via the second communication path 11. Therefore, the reference information is updated every transmission cycle of the second communication path 11 or every processing cycle of each of the motor control apparatuses 5A to 5D, and the control command for self-sustained operation is also updated every such cycle. As a result, each of the motor control apparatuses 5A to 5D can execute the synchronous operation in the transmission period of the second communication path 11 or in the processing period of the motor control apparatuses 5A to 5D without depending on the processing period of the host control apparatus 3. Therefore, the command resolution can be made finer and the synchronization accuracy can be improved.

In this embodiment, the external sensor 17 may be a position sensor that detects the position information of the object to be driven by any one of the motors 7 (for example, the motor 7D) and outputs the position information to the corresponding motor control apparatus 5 (for example, the motor control apparatus 5D).

In this case, the plurality of motor control apparatuses 5A to 5D can be synchronized and independently operated based on, for example, the position information of the object to be driven by the motor 7D detected by the external sensor 17. Further, when the position information is detected by using, for example, the encoder 13D mounted on the motor 7D instead of the external sensor 17, a new device for generating and outputting the reference information is not required, so that cost increase can be suppressed.

In the present embodiment, the command conversion unit 25 may convert the position information into a position instruction based on correlation information between the position information detected by the external sensor 17 and the position instruction corresponding to the motor 7 to be controlled.

In this embodiment, each of the motor control apparatuses 5A to 5D converts the common position information into an individual position command corresponding to the motor 7 to be controlled by the motor control apparatuses 5A to 5D based on the correlation information. As a result, the plurality of motor control apparatuses 5A to 5D can be accurately synchronized and independently operated. For example, it is possible to independently perform electronic cam control of a plurality of axes.

In this embodiment, the host control apparatus 3 may have a start command output unit 21 that outputs a start command to a plurality of motor control apparatuses 5A to 5D at a predetermined timing, and in this case, each of the plurality of motor control apparatuses 5A to 5D may share the reference information by the information sharing unit 23 when receiving the start command, convert the reference information into a control command for self-sustained operation by the command conversion unit 25, and control the motor 7 to be controlled by the motor control unit 27 based on the converted control command.

In this case, it is possible to switch from the normal operation based on the control command output from the host control apparatus 3 to the self-sustained operation independent of the host control apparatus 3 at an arbitrary timing. As a result, for example, when the processing load of the host control apparatus 3 is small or when high synchronization accuracy is not required, the normal operation is performed, and for example, when the processing load of the host control apparatus 3 increases or when high synchronization accuracy is required, it is possible to switch to the self-sustained operation only for a necessary period.

2. Second Embodiment

The second embodiment is an embodiment in which the motor control system 1 is applied to a system for outputting a fixed point passing signal.

(2-1 Overall Configuration of Motor Control System)

An example of the overall configuration of a motor control system 100 according to the second embodiment will be described with reference to FIGS. 5 and 6.

Figure 5:
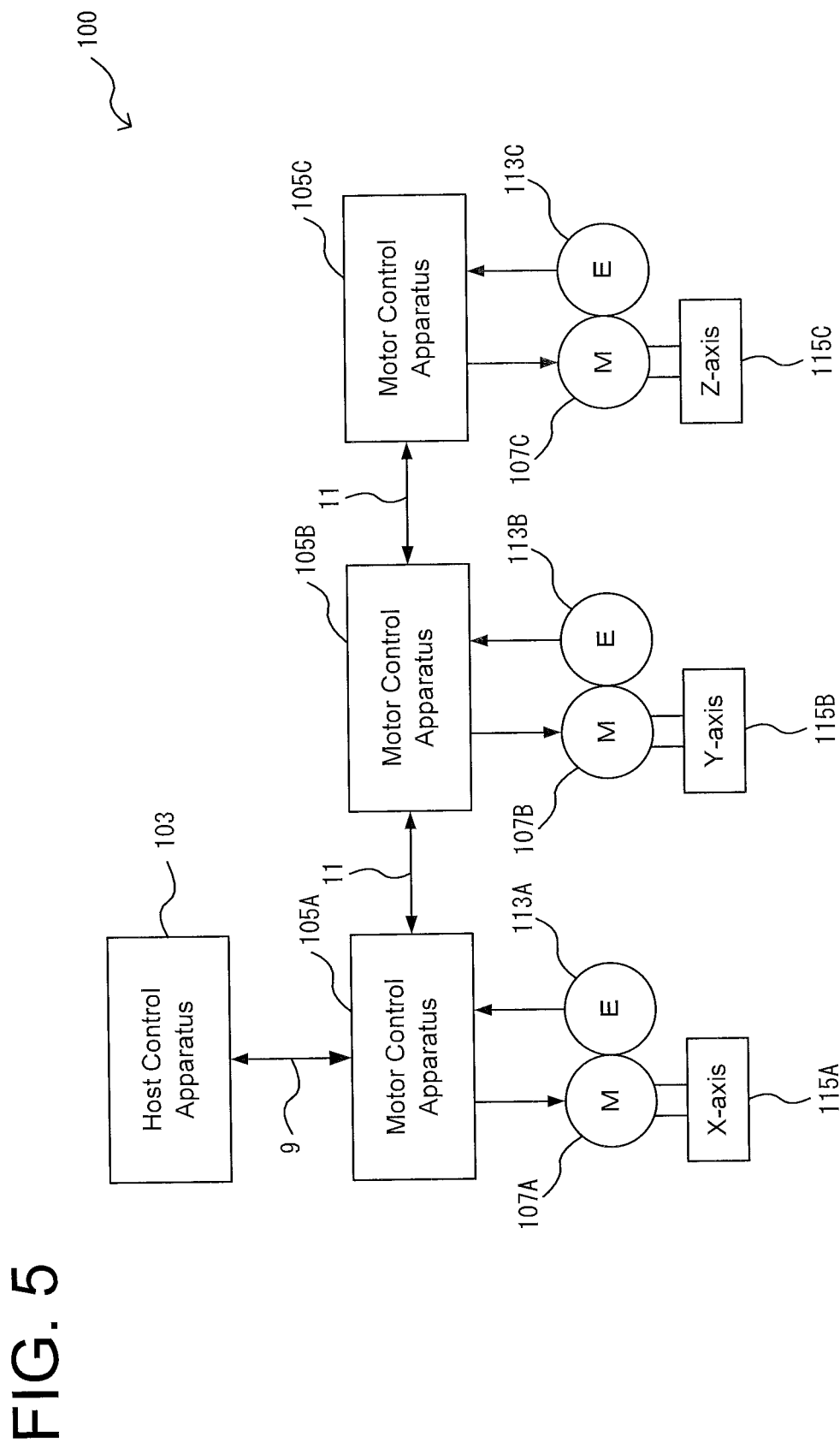
FIG. 5 is a diagram showing an example of the overall configuration of a motor control system according to a second embodiment.

As shown in FIG. 5, the motor control system 100 includes a host control apparatus 103, a plurality of (for example, three) motor control apparatuses 105A to 105C, and a plurality of (for example, three) motors 107A to 107C.

Like the host control apparatus 3 described above, the host control apparatus 103 includes a computer such as a general-purpose personal computer, a PLC, a motion controller, and the like. The host control apparatus 103 generates control commands (for example, position command, speed command, torque command, etc.) for controlling the motors 107A to 107C, and transmits them to the motor control apparatuses 105A to 105C, respectively.

Each of the motor control apparatuses 105A to 105C controls each of the motors 107A to 107C based on the control command received from the host control apparatus 103. The motor control apparatuses 105A to 105C are connected in series with the host control apparatus 103, and can perform data communication with each other via the second communication path 11. A specific one of the motor control apparatuses 105A to 105C (for example, the motor control apparatus 105A) is connected to the host control apparatus 103 via the first communication path 9 so as to be able to perform data communication with each other.

The motor control apparatus 105A controls the motor 107A by supplying electric power to the motor 107A based on the control command received from the host control apparatus 103 and the position information received from the encoder 113A. The motor 107A is a motor corresponding to the X-axis, and drives the X-axis mechanism 115A of the stage apparatus 115 which can be driven in the X-axis, Y-axis, and Z-axis directions in the three dimensional orthogonal coordinate system shown in FIG. 6. The encoder 113A detects the position information in the X-axis direction of the movable part (for example, the Y-axis mechanism 115B) driven by the motor 107A, and transmits the position information to the motor control apparatus 105A.

The motor control apparatus 105B controls the motor 107B by supplying electric power to the motor 107B based on the control command received from the host control apparatus 103 and the position information received from the encoder 113B. The motor 107B is a motor corresponding to the Y axis, and drives the Y axis mechanism 115B of the stage apparatus 115 shown in FIG. 6. The encoder 113B detects the position information in the Y-axis direction of the movable part (for example, the movable table 111) driven by the motor 107B, and transmits it to the motor control apparatus 105B.

The motor control apparatus 105C controls the motor 107C by supplying electric power to the motor 107C based on the control command received from the host control apparatus 103 and the position information received from the encoder 113C. The motor 107C is a motor corresponding to the Z-axis and drives the Z-axis mechanism 115C of the stage apparatus 115 shown in FIG. 6. The encoder 113C detects the position information in the Z-axis direction of the movable part (for example, the X-axis mechanism 115A) driven by the motor 107C, and transmits the position information to the motor control apparatus 105C.

Figure 6:
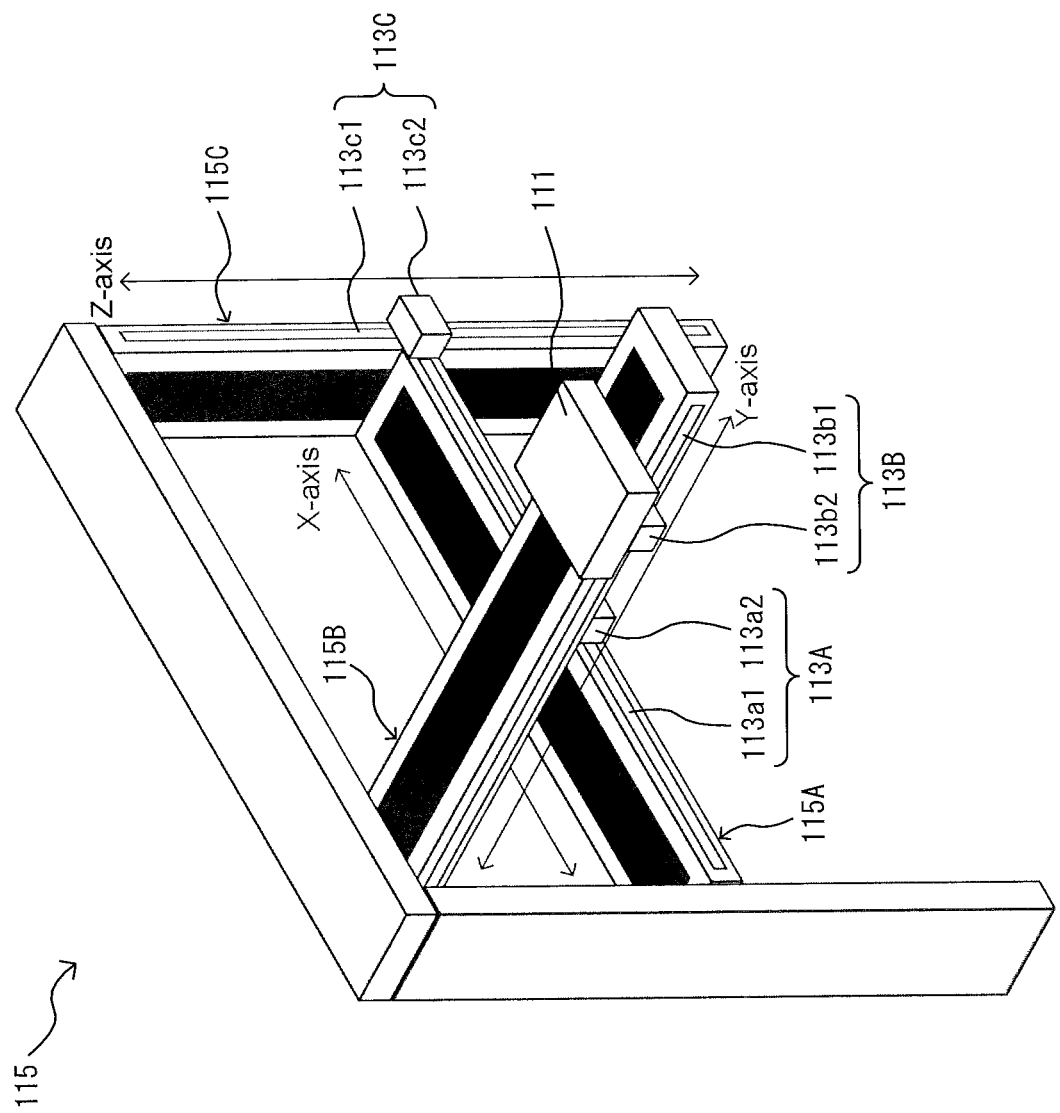
FIG. 6 is a perspective view showing an example of the structure of a stage apparatus driven by a motor control system according to a second embodiment.

As shown in FIG. 6, the stage apparatus 115 (an example of a driving machine) includes an X-axis mechanism 115A arranged along the X-axis direction, a Y-axis mechanism 115B arranged along the Y-axis direction, a Z-axis mechanism 115C arranged along the Z-axis direction, and a movable table 111. The X-axis mechanism 115A, the Y-axis mechanism 115B, and the Z-axis mechanism 115C are arranged so as to be substantially orthogonal to each other and are mechanically connected to each other. The X-axis mechanism 115A is connected to a movable part of the Z-axis mechanism 115C, and is entirely moved in the Z-axis direction by the drive of the motor 107C. The Y-axis mechanism 115B is connected to the movable part of the X-axis mechanism 115A, and is entirely moved in the X-axis direction by the drive of the motor 107A. The movable table 111 is connected to the movable part of the Y-axis mechanism 115B, and is moved in the Y-axis direction by the drive of the motor 107B. The motors 107A, 107B and 107C are controlled in synchronization so that the movable table 111 moves to a desired position.

The X-axis mechanism 115A, the Y-axis mechanism 115B, and the Z-axis mechanism 115C have motors 107A, 107B, and 107C, respectively, and encoders 113A, 113B, and 113C for detecting the axial positions of the respective movable parts. The motors 107A to 107C may be linear motors or rotary motors. In the case of a rotary motor, for example, rotation is converted into linear motion by a ball screw mechanism or the like. The encoders 113A, 113B, and 113C (an example of a sensor) are, for example, linear encoders. When the motors 107A to 107C are rotary motors, they may be rotary encoders. The encoder 113A includes a linear scale 113*a*1 and a scale head 113*a*2. The encoder 113B includes a linear scale 113*b*1 and a scale head 113*b*2. The encoder 113C includes a linear scale 113*c*1 and a scale head 113*c*2. The encoders 113A, 113B, and 113C detect the positions of the movable parts, and transmit position information to the corresponding motor control apparatuses 105A, 105B, and 105C, respectively.

The host control apparatus 103 transmits an X-axis position command to the motor control apparatus 105A, transmits a Y-axis position command to the motor control apparatus 105B, and transmits a Z-axis position command to the motor control apparatus 105C. Each of the motor control apparatuses 105A to 105C refers to the position information received from the encoders 113A to 113C and controls each of the motors 107A to 107C so that the position of the movable part driven by the corresponding motors 107A to 107C matches the position command. With the above-described configuration, the stage apparatus 115 moves the movable table 111 to positions corresponding to the X-axis, Y-axis and Z-axis position commands transmitted from the host control apparatus 103.

It should be noted that the configuration of the motor control system 100 described above is merely an example, and is not limited to the above contents. For example, the number (number of axes) of the motor control apparatus 105 and the motor 107 may be a plurality other than three. For example, when the present invention is applied to a stage apparatus or the like which can be driven in the X-axis and Y-axis directions in a two-dimensional orthogonal coordinate system, the number of axes may be two. In addition to the X-axis, Y-axis and Z-axis, the number of axes may be four or more when the present invention is applied to a multi-axis drive machine which can be driven, for example, in the rotational direction (θ-axis). Further, any of the motor control apparatuses 105B and 105C may be connected to the host control apparatus 103.

In the present embodiment, when motor control apparatuses 105A to 105C, motors 107A to 107C, and encoders 113A to 113C are not distinguished from each other, they are described as motor control apparatus 105, motor 107, and encoder 113.

(2-2. Functional Configuration of Host Control Apparatus and Motor Control Apparatus)

Figure 7:
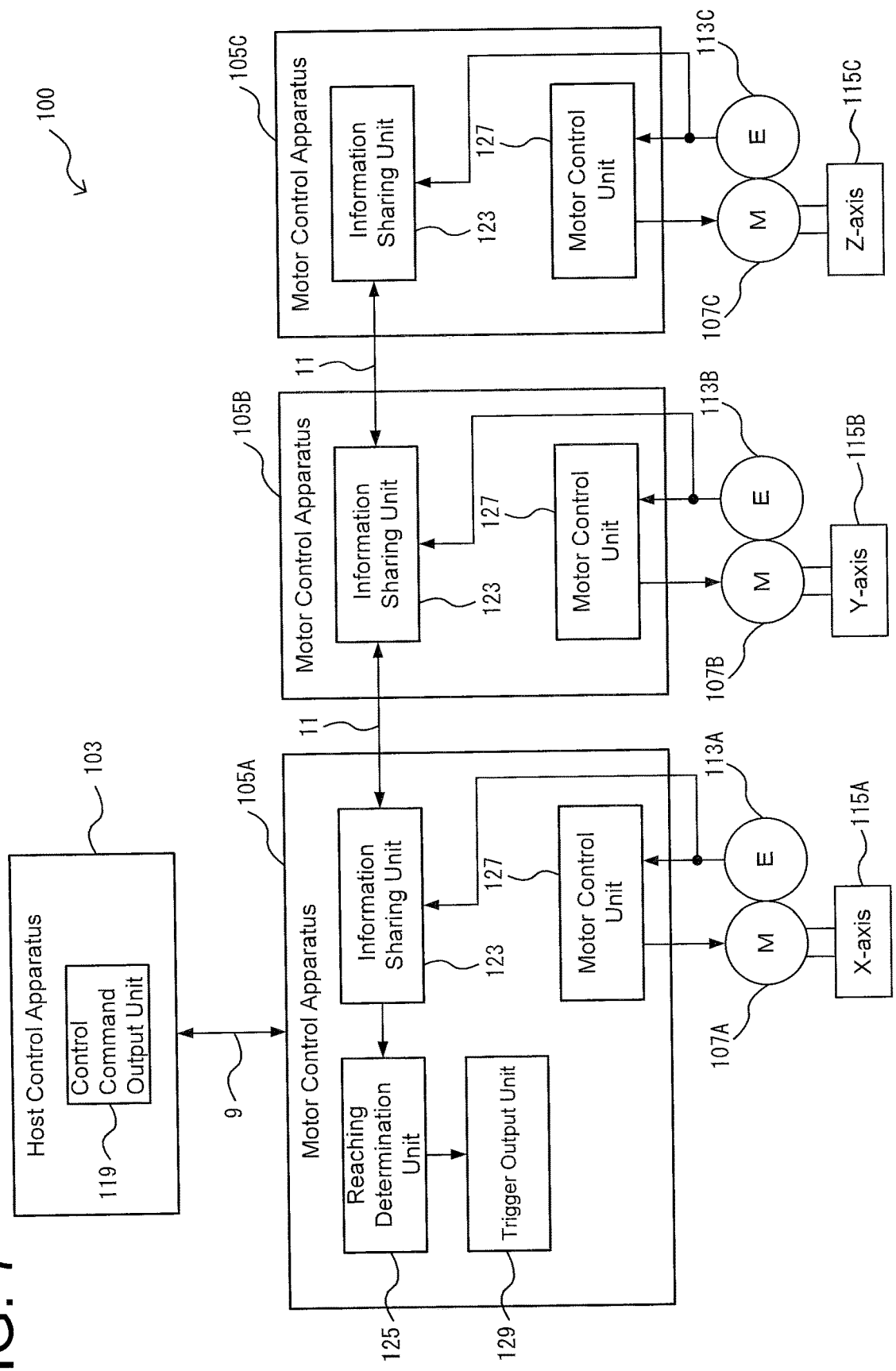
FIG. 7 is a block diagram showing an example of a functional configuration of the host control apparatus and a motor control apparatus.

Referring to FIG. 7, an example of a functional configuration of the host control apparatus 103 and the motor control apparatuses 105A to 105C will be described.

As shown in FIG. 7, the host control apparatus 103 includes a control command output unit 119. The control command output unit 119 generates a control command (for example, a position command, a speed command, a torque command, etc.) for controlling the operation of each of the motors 107A to 107C, and transmits the generated control command to the corresponding motor control apparatuses 105A to 105C. Since the motor control apparatuses 105A to 105C are connected in series as described above, control commands to the motor control apparatus 105A are transmitted through the first communication path 9, and control commands to the motor control apparatuses 105B and 105C are transmitted through the first communication path 9 and the second communication path 11, respectively.

Each of the motor control apparatuses 105A to 105C includes an information sharing unit 123 and a motor control unit 127. The information sharing unit 123 shares the position information detected by the encoders 113A, 113B, and 113C among the motor control apparatuses 105A to 105C through data communication via the second communication path 11. Specifically, the information sharing unit 123 of the motor control apparatus 105A shares the X-axis position information received from the encoder 113A, and transmits the shared information to the information sharing units 123 of the motor control apparatuses 105B and 105C via the second communication path 11. Similarly, the information sharing unit 123 of the motor control apparatus 105B shares the Y-axis position information received from the encoder 113B and transmits the shared information to the information sharing units 123 of the motor control apparatuses 105A and 105C via the second communication path 11. Similarly, the information sharing unit 123 of the motor control apparatus 105C shares the Z-axis position information received from the encoder 113C, and transmits the shared information to the information sharing units 123 of the motor control apparatuses 105A and 105B via the second communication path 11. As a result, each of the motor control apparatuses 105A to 105C shares position information on all of the X-axis, Y-axis, and Z-axis. The shared position information of the encoders 113A, 113B, and 113C is also transmitted to the host control apparatus 103 via the first communication path 9.

The motor control unit 127 controls the motor 107 to be controlled based on the control command received from the host control apparatus 103 and the position information received from the corresponding encoder 113. Specifically, the motor control unit 127 includes, for example, a position control unit, a speed control unit, a current control unit (not illustrated) and the like. For example, when receiving a position command from the host control apparatus 103, the position controller generates a speed command based on a position deviation obtained by subtracting a feedback position based on detection information of the encoder 113 from the position command, for example, by PID control or the like. The speed control unit generates a torque command by, for example, PID control or the like based on a speed deviation obtained by subtracting a feedback speed based on information detected by the encoder 113 from the speed command. The current controller converts electric power based on the torque command and supplies electric power to the motor 107.

At least one of the motor control apparatuses 105A to 105C, the motor control apparatus 5A (for example, the motor control apparatus 105A) includes a reaching determination unit (an example of "reaching determination circuitry") 125 and a trigger output unit (an example of "trigger output circuitry") 129. The reaching determination unit 125 determines whether or not the reference point of the stage apparatus 115 driven by the plurality of motors 107A to 107C has reached a predetermined position (hereinafter also referred to as "fixed point" as appropriate) based on the position information of the X-axis, the Y-axis, and the Z-axis shared by the information sharing unit 123. The "reference point" is a control point of the stage apparatus 115, for example, the center position of the movable table 111. The "predetermined position" is a predetermined coordinate position in a three-dimensional orthogonal coordinate system including an X-axis, a Y-axis, and a Z-axis (hereinafter also referred to as a "fixed point" as appropriate).

The reaching determination unit 125 may determine whether or not the reference point of the stage apparatus 115 has actually reached or passed the fixed point, or may determine whether or not the reaching time has elapsed by calculating the reaching time at which the reference point reaches or passes the fixed point (for example, the estimated elapsed time from the current point to the arrival).

When the reaching determination unit 125 determines that the reference point of the stage apparatus 115 has reached the fixed point, the trigger output unit 129 outputs a trigger signal to, for example, the host control apparatus 103. When the reaching determination unit 125 estimates the reaching time as described above, the trigger output unit 129 outputs a trigger signal when it is determined that the reaching time has elapsed. The trigger signal is used for operation of an external device such as imaging by a camera, for example. The trigger signal may be transmitted to an external device other than the host control apparatus 103, or may be transmitted to the motor control apparatuses 105B and 105C via the information sharing unit 123.

In addition to or in place of the motor control apparatus 105A, at least one of the motor control apparatuses 105B and 105C may have the functions of the reaching determination unit 125 and the trigger output unit 129.

The processing in the control command output unit 119 and the like of the host control apparatus 103, the processing in the information sharing unit 123 and the motor control unit 127 and the like of the motor control apparatuses 105B and 105C, and the processing in the information sharing unit 123, the reaching determination unit 125, the motor control unit 127, and the trigger output unit 129 and the like of the motor control apparatus 105A are not limited to the examples of sharing of these processes. For example, the processing may be performed by a smaller number of processing units (for example, one processing unit), or may be performed by further subdivided processing units. In the motor control apparatuses 105A to 105C, only a portion (such as an inverter) for supplying electric power to the motors 107A to 107C is mounted by an actual device, and the other functions of each processing unit may be mounted by a program executed by a CPU901 (see FIG. 13) described later, or a part or all of the functions may be mounted by an actual device such as an ASIC, an FPGA, or other electric circuit.

(2-3. Processing Procedure of Motor Control Apparatus)

Figure 8:
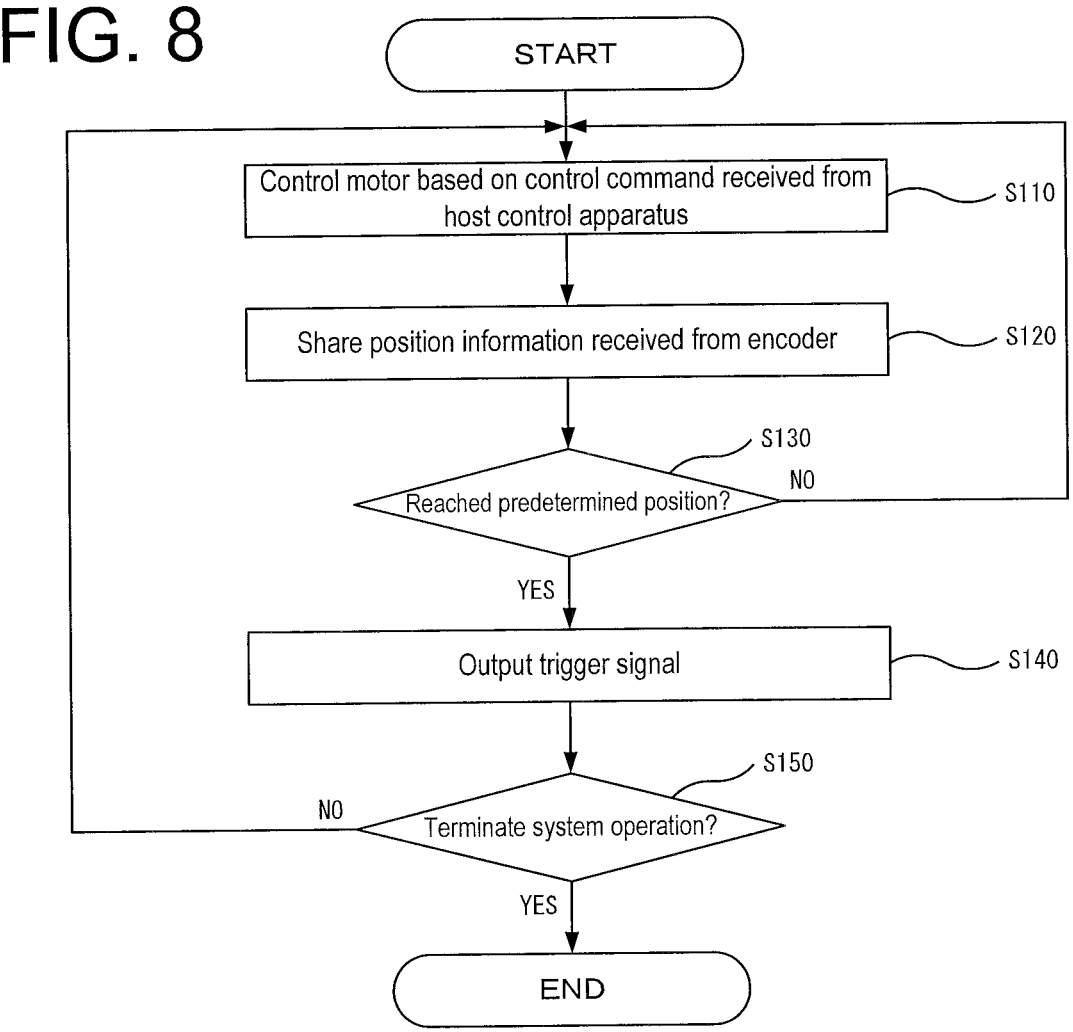
FIG. 8 is a flowchart showing an example of a processing procedure executed by the motor control apparatus.

An example of a processing procedure executed by the motor control apparatus 105A will be described with reference to FIG. 8.

In step 110, the motor control apparatus 105A controls the motor 107A by the motor control unit 127 based on the control command received from the host control apparatus 103 and the position information received from the encoder 113A.

In step 120, the motor control apparatus 105A shares the position information received from the encoders 113A to 113C with each other through the data communication via the second communication path 11 by the information sharing unit 123. Specifically, the motor control apparatus 105A shares the X-axis position information received from the encoder 113A by the information sharing unit 123, and transmits the shared X-axis position information to the other motor control apparatuses 105B and 105C. Further, Y-axis position information by the encoder 105B shared by the information sharing unit 123 of the motor control apparatus 113B and Z-axis position information by the encoder 113C shared by the information sharing unit 123 of the motor control apparatus 105C are acquired through the data communication via the second communication path 11.

In step 130, the motor control apparatus 105A determines whether or not the reference point of the stage apparatus 115 driven by the plurality of motors 107A to 107C has reached a predetermined position (fixed point) by the reaching determination unit 125 based on the position information of the X-axis, the Y-axis, and the Z-axis shared by the information sharing unit 123. It should be noted that the determination in step 130 includes calculating the reaching time at which the reference point reaches or passes the fixed point as described above, and determining whether or not the reaching time has elapsed. If the reference point has not reached the fixed point (step S130: NO), the process returns to step S110. On the other hand, when the reference point has reached the fixed point (step S130: YES), the process proceeds to step S140.

In step 140, the motor control apparatus 105A outputs a trigger signal to, for example, the host control apparatus 103 by the trigger output unit 129.

In step 150, the motor control apparatus 105A determines whether or not to terminate the operation of the motor control system 100. If the operation of the system is to be continued (step S150: NO), the process returns to step S110 and the same procedure is repeated. On the other hand, when the operation of the system is to be terminated (step S150: YES), this flowchart is terminated.

The processing procedure described above is an example, and at least a part of the above procedure may be deleted or changed, or other procedures may be added. Further, the order of at least a part of the above-described procedures may be changed, or a plurality of procedures may be combined into a single procedure.

(2-4. Effects of Second Embodiment)

As described above, a motor control system 100 according to a second embodiment comprises a host control apparatus 103 which outputs a control command, a plurality of motor control apparatuses 105A to 105C which control a plurality of motors 107A to 107C based on the control command, and a plurality of encoders 113A to 113C which detect position information of a movable part of each of the motors 107A to 107C and output the position information to corresponding motor control apparatuses 105A to 105C, each of the plurality of motor control apparatuses 105A to 105C comprises an information sharing unit 123 which shares the position information detected by the encoders 113A to 113C with each other via data communication between the plurality of motor control apparatuses 105A to 105C, and a motor control apparatus 105A which is at least one of the motor control apparatuses 105A to 105C comprises a reaching determination unit 125 which determines whether or not a reference point of a stage apparatus 115 driven by the motors 107A to 107C has reached a predetermined position based on the shared position information, and a trigger output unit 129 which outputs a trigger signal when it is determined that the reference point has reached the predetermined position.

In general, in the motor control system 1, when outputting a trigger signal when a reference point reaches or passes through a predetermined position, each of motor control apparatuses determines whether or not the reference point passes through the predetermined position by using the position information of its own axis and outputs a signal. Therefore, when position information of a plurality of axes is required, for example, determination of passing through a fixed point in an XYZ coordinate system or the like, the motor control apparatus alone cannot cope with it, and the host control apparatus generally monitors the position of each axis to perform determination of passing through a fixed point, but this causes an increase in the processing load of the host control apparatus.

In the motor control system 100 of this embodiment, the encoder 113 detects the position information of the movable part of the motor 107 in each axis and outputs it to the corresponding motor control apparatus 105. Each of the plurality of motor control apparatuses 105A to 105C shares position information with each other through data communication. At least one of the plurality of motor control apparatuses 105A to 105C determines whether or not the reference point of the stage apparatus 115 has reached a predetermined position based on the shared position information, and outputs a trigger signal the shared position information, and outputs a trigger signal if it is determined that the reference point has reached a predetermined position. In this way, since each of the motor control apparatuses 105A to 105C can share not only the position information of the motor 107 which is the control target of the motor control apparatus itself but also the position information of other motors 107, it is possible to independently determine whether or not the reference point of the stage apparatus 115 has reached a predetermined position by the motor control apparatus alone (in this embodiment, the motor control apparatus 105A alone) without processing by the host control apparatus 103. Therefore, the fixed point output function can be realized by the motor control apparatus alone. As a result, the host control apparatus 103 does not need to perform the process of acquiring and determining the position information from each of the motor control apparatuses 105A to 105C, so that the processing load on the host control apparatus 103 can be reduced.

In the present embodiment, the determination by the reaching determination unit 125 may include a process of calculating an reaching time at which the reference point reaches a predetermined position based on the shared position information and determining whether or not the reaching time has elapsed, and in this case, the trigger output unit 129 may output a trigger signal when it is determined that the reaching time has elapsed.

In the present embodiment, the reaching determination unit 125 of the motor control apparatus 105A may determine whether or not the reference point of the stage apparatus 115 has actually reached or passed the predetermined position based on the shared position information, or may calculate the reaching time for the reference point to reach or pass the predetermined position and determine whether or not the reaching time has elapsed. Since it is not necessary to continuously monitor the position information as in the case of determining whether or not the reference point has actually passed actually passed through the fixed point, the processing load of the motor control apparatus 105A can be reduced in the case where the reaching time is predicted and the determination is made with the elapse of time.

In this embodiment, the plurality of motor control apparatuses 105A to 105C may be three motor control apparatuses 5A that respectively control three motors 107A to 107C corresponding to the X-axis, the Y-axis, and the Z-axis in the three dimensional orthogonal coordinate system. In this case, the information sharing unit 123 may share position information on the X-axis, the Y-axis, and the Z-axis detected by the plurality of encoders 113A to 113C, and the reaching determination unit 125 may determine whether or not the reference point has reached a predetermined position in the three-dimensional orthogonal coordinate system based on the shared position information on the X-axis, the Y-axis, and the Z-axis.

In this case, the fixed point output function in the three dimensional orthogonal coordinate system can be realized by the motor control apparatus alone (in this embodiment, the motor control apparatus 105A alone).

3. Third Embodiment

The third embodiment is an embodiment in which the motor control system is applied to a gantry mechanism having a control parameter compensation function.

(3-1 Overall Configuration of Motor Control System)

An example of the overall configuration of a motor control system 200 according to a third embodiment will be described with reference to FIGS. 9 and 10.

Figure 9:
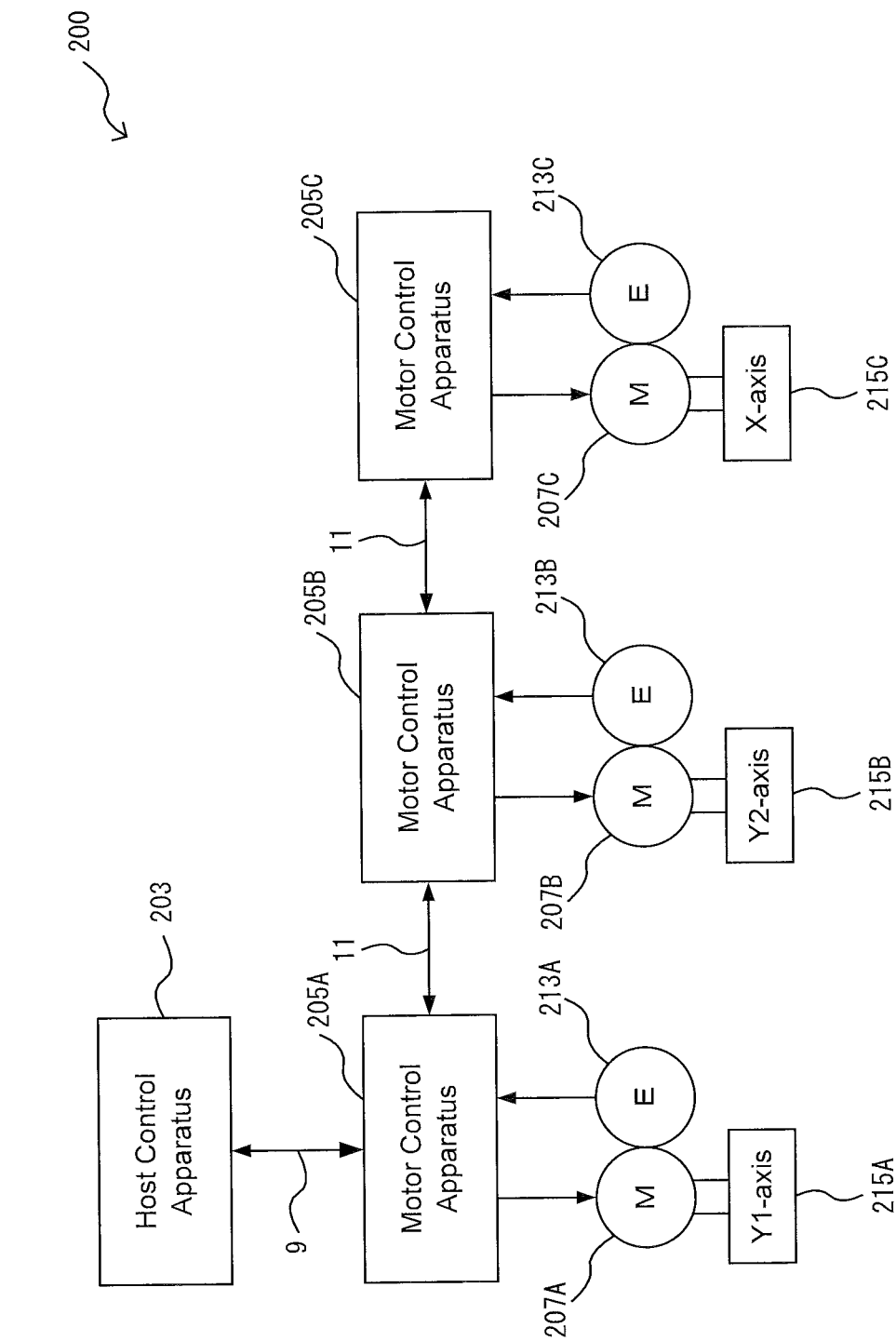
FIG. 9 is a diagram showing an example of the overall configuration of a motor control system according to a third embodiment.

As shown in FIG. 9, the motor control system 200 includes a host control apparatus 203, a plurality of (for example, three) motor control apparatuses 205A to 205C, and a plurality of (for example, three) motors 207A to 207C.

The host control apparatus 203, like the host control apparatus 3, 103 described above, is configured by a computer such as a general-purpose personal computer, PLC, motion controller, etc. The host control apparatus 203 generates control commands (for example, position command, speed command, torque command, etc.) for controlling the motors 207A to 207C, and transmits them to the motor control apparatuses 205A to 205C, respectively.

Each of the motor control apparatuses 205A to 205C controls each of the motors 207A to 207C based on the control command received from the host control apparatus 203. The motor control apparatuses 205A to 205C are connected in series with the host control apparatus 203, and can perform data communication with each other via the second communication path 11. Further, one specific motor control apparatus 5A (for example, motor control apparatus 205A) among the motor control apparatuses 205A to 205C is connected to the host control apparatus 203 via the first communication path 9 so as to be able to perform data communication with each other.

The motor control apparatus 205A (an example of a first motor control apparatus) supplies electric power to the motor 207A based on the control command received from the host control apparatus 203 and the position information received from the encoder 213A to control the motor 207A. The motor 207A (an example of the first motor) is a motor corresponding to the Y1 axis and drives the Y1-axis mechanism 215A that can be driven along the Y1-axis direction (an example of the first axis direction) of the gantry mechanism 215 shown in FIG. 10. The encoder 213A detects the position information in the Y1-axis direction of the movable part (for example, the X-axis mechanism 215C) driven by the motor 207A, and transmits it to the motor control apparatus 205A.

The motor control apparatus 205B (an example of the second motor control apparatus 5A) supplies electric power to the motor 207B based on the control command received from the host control apparatus 203 and the position information received from the encoder 213B to control the motor 207B. The motor 207B (an example of the second motor) is a motor corresponding to the Y2-axis, and drives the Y2-axis mechanism 215B that can be driven along the Y2-axis direction (an example of the second axis direction) substantially parallel to the Y1-axis direction in the gantry mechanism 215 shown in FIG. 10. The encoder 213B detects the position information in the Y2-axis direction of the movable part (for example, the X-axis mechanism 215C) driven by the motor 207B, and transmits it to the motor control apparatus 205B.

The motor control apparatus 205C (an example of the third motor control apparatus) supplies electric power to the motor 207C based on the control command received from the host control apparatus 203 and the position information received from the encoder 213C, thereby controlling the motor 207C. The motor 207C (an example of the third motor) is a motor corresponding to the X-axis, and drives the X-axis mechanism 215C that can be driven along the X-axis direction (an example of the second axis direction) substantially perpendicular to the Y1-axis direction and the Y2-axis direction so as to pass between the movable parts of the Y1-axis mechanism 215A and the Y2-axis mechanism 215B in the gantry mechanism 215 shown in FIG. 10. The encoder 213C detects the position information in the X-axis direction of the movable part (for example, the head 211) driven by the motor 207C, and transmits the position information to the motor control apparatus 205C.

Figure 10:
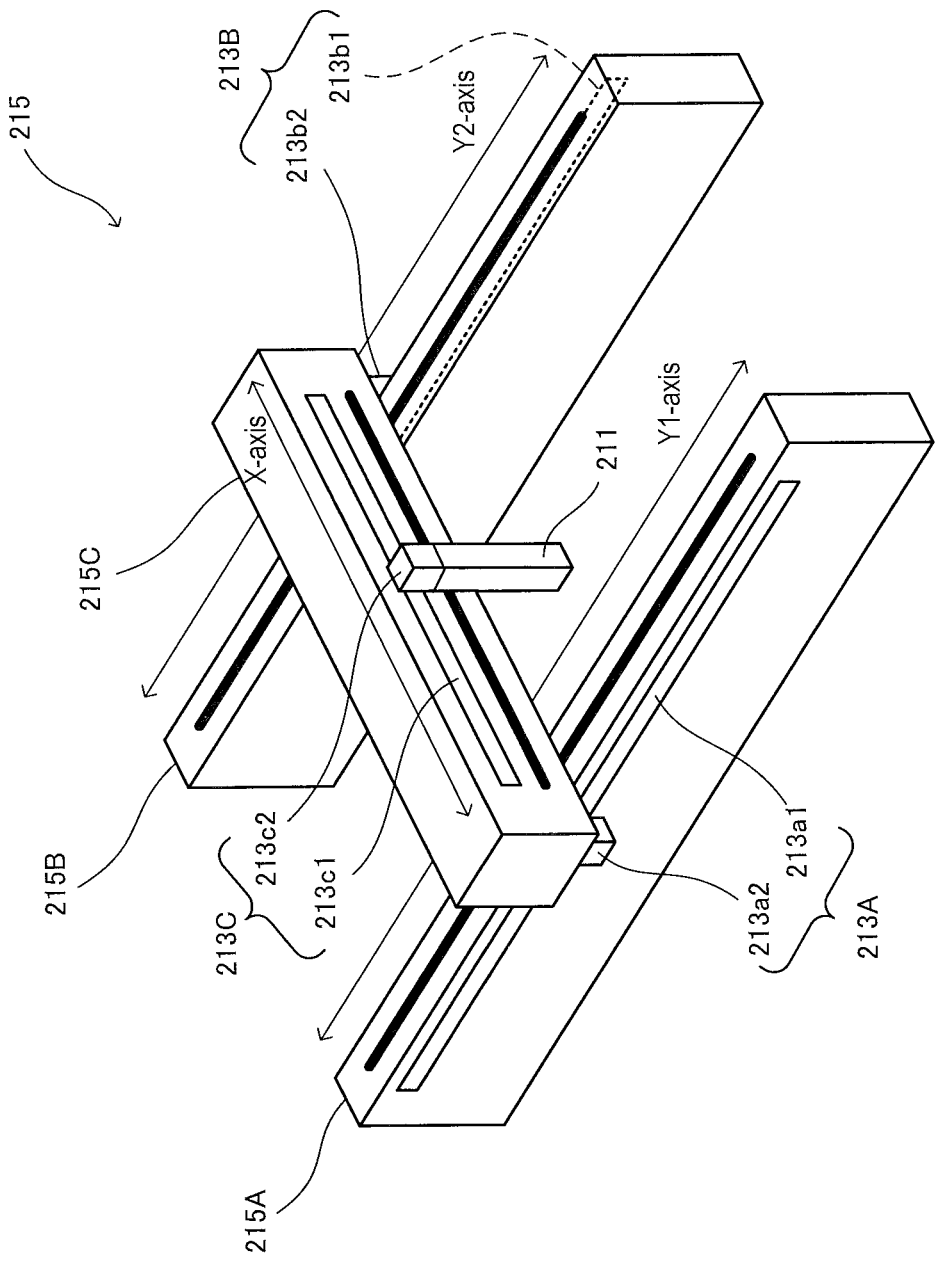
FIG. 10 is a perspective view showing an example of the structure of a gantry mechanism driven by a motor control system according to a third embodiment.

As shown in FIG. 10, the gantry mechanism 215 includes a Y1-axis mechanism 215A and a Y2-axis mechanism 215B arranged substantially parallel to the Y-axis direction (Y1-axis direction and Y2-axis direction), an X-axis mechanism 215C arranged substantially perpendicular to the Y-axis direction, and a head 211. The Y1-axis mechanism 215A and the Y2-axis mechanism 215B are arranged such that linear movable ranges of substantially the same length are parallel to and overlap with each other in the Y-axis direction and are controlled in synchronization by the motors 207A and 207B so that the respective movable parts move at the same position in the Y-axis direction. The X-axis mechanism 215C entirely moves in the Y-axis direction by the driving of the motors 207A and 207B, and also moves the movable part to which the head 211 is connected by the motor 207C in the X-axis direction.

The Y1-axis mechanism 215A, the Y2-axis mechanism 215B, and the X-axis mechanism 215C have motors 207A, 207B, and 207C, respectively, and encoders 213A, 213B, and 213C for detecting the axial positions of the respective movable parts. The motors 207A to 207C may be linear motors or rotary motors. In the case of a rotary motor, for example, rotation is converted into linear motion by a ball screw mechanism or the like. The encoders 213A, 213B, and 213C (an example of a sensor) are, for example, linear encoders. When the motors 207A to 207C are rotary motors, they may be rotary encoders. The encoder 213A includes a linear scale 213a1 and a scale head 213a2. The encoder 213B includes a linear scale 213b1 and a scale head 213b2. The encoder 213C includes a linear scale 213c1 and a scale head 213c2. The encoders 213A, 213B, and 213C detect the positions of the movable parts, and transmit position information to the corresponding motor control apparatuses 205A, 205B, and 205C, respectively.

The host control apparatus 203 transmits a Y1-axis position command to the motor control apparatus 205A, transmits a Y2-axis position command to the motor control apparatus 205B, and transmits an X-axis position command to the motor control apparatus 205C. Each of the motor control apparatuses 205A to 205C refers to the position information received from the encoders 213A to 213C and controls each of the motors 207A to 207C so that the position of the movable part driven by the corresponding motors 207A to 207C matches the position command With the configuration described above, the gantry mechanism 215 moves the head 211 to positions corresponding to the Y1-axis, Y2-axis, and X-axis position commands transmitted from the host control apparatus 203.

It should be noted that the configuration of the motor control system 200 described above is an example, and is not limited to the above contents. For example, when the head 211 can be driven in the rotational direction (θ-axis), the number of motor control apparatuses 205 and motors 207 (the number of axes) may be four or more. Further, any of the motor control apparatuses 205B and 205C may be connected to the host control apparatus 203.

In the present embodiment, when motor control apparatuses 205A to 205C, motors 207A to 207C, and encoders 213A to 213C are not distinguished from each other, they are referred to as motor control apparatus 205, motor 207, and encoder 213.

(3-2. Functional Configuration of Host Control Apparatus and Motor Control Apparatus)

Figure 11:
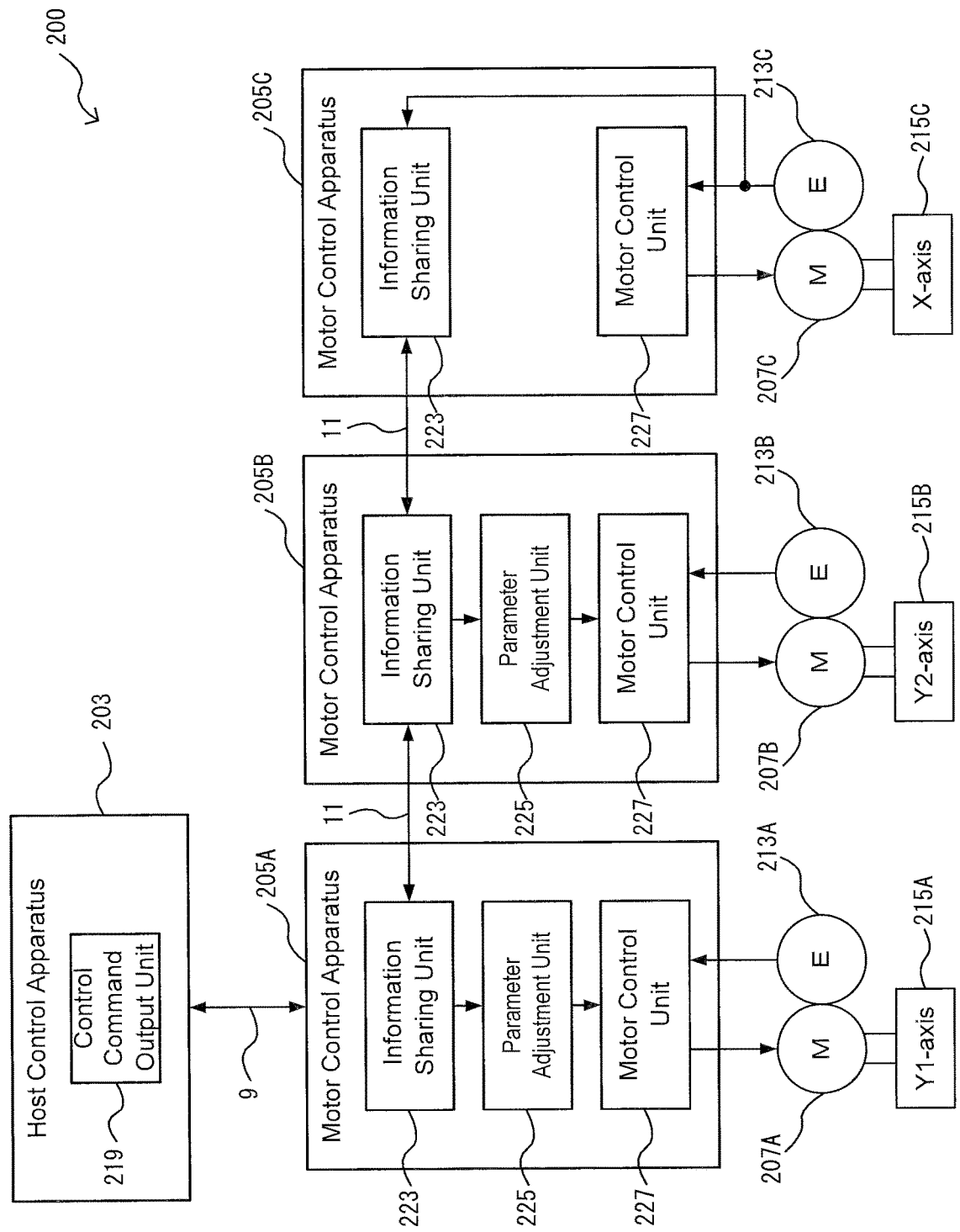
FIG. 11 is a block diagram showing an example of a functional configuration of the host control apparatus and a motor control apparatus.

Referring to FIG. 11, an example of a functional configuration of the host control apparatus 203 and the motor control apparatuses 205A to 205C will be described.

As shown in FIG. 11, the host control apparatus 203 has a control command output unit 219. The control command output unit 219 generates a control command (for example, a position command, a speed command, a torque command, etc.) for controlling the operation of each of the motors 207A to 207C, and transmits the generated control command to the corresponding motor control apparatuses 205A to 205C. Since the motor control apparatuses 205A to 205C are connected in series as described above, control commands to the motor control apparatus 205A are transmitted through the first communication path 9, and control commands to the motor control apparatuses 205B and 205C are transmitted through the first communication path 9 and the second communication path 11, respectively.

Each of the motor control apparatuses 205A to 205C includes an information sharing unit 223 and a motor control unit 227. The information sharing unit 223 shares the X-axis position information (position information of the head 211) detected by the encoder 213C among the motor control apparatuses 205A to 205C through data communication via the second communication path 11. Specifically, the information sharing unit 223 of the motor control apparatus 205C shares the X-axis position information received from the encoder 213C, and transmits the shared information to the information sharing units 223 of the motor control apparatuses 205A and 205B via the second communication path 11. As a result, the motor control apparatuses 205A and 205B share the X-axis position information of the motor control apparatus 205C. The shared position information of the encoder 213C is also transmitted to the host control apparatus 203 via the first communication path 9.

The motor control unit 227 controls the motor 207 to be controlled based on the control command received from the host control apparatus 203 and the position information received from the corresponding encoder 213. Specifically, the motor control unit 227 includes, for example, a position control unit, a speed control unit, a current control unit (not illustrated) and the like. For example, when receiving a position command from the host control apparatus 203, the position controller generates a speed command based on a position deviation obtained by subtracting a feedback position based on detection information of the encoder 213 from the position command, for example, by PID control or the like. The speed control unit generates a torque command by, for example, PID control or the like based on a speed deviation obtained by subtracting a feedback speed based on information detected by the encoder 213 from the speed command. The current controller converts electric power based on the torque command and supplies electric power to the motor 207.

At least one of the motor control apparatuses 205A to 205C, the motor control apparatus 5A (for example, the motor control apparatuses 205A and 205B) has a parameter adjustment unit (an example of "parameter adjustment circuitry") 225. The parameter adjustment unit 225 adjusts control parameters related to the control of the motor 207 which is a control target based on the X-axis position information shared by the information sharing unit 223. The "control parameter" is a parameter that varies according to the X-axis position information, and is, for example, an inertia setting value related to the control of the motors 207A and 207B. The parameter adjustment unit 225 increases the set value of the inertia as the position of the head 211 is closer to the motor control apparatus 205 of itself, and decreases the set value of the inertia as the position of the head 211 is farther from the motor control apparatus 205 of itself.

The motor control unit 227 controls the motor 207 to be controlled based on the control command received from the host control apparatus 203 and the control parameter (set value of inertia) adjusted by the parameter adjustment unit 225.

The processing in the control command output unit 219 and the like of the host control apparatus 203, the processing in the information sharing unit 223 and the motor control unit 227 and the like of the motor control apparatuses 205A to 205C, and the processing in the parameter adjustment unit 225 and the like of the motor control apparatuses 205A and 205B are not limited to the examples of sharing of these processes. For example, the processing may be performed by a smaller number of processing units (for example, one processing unit), or may be performed by further subdivided processing units. In the motor control apparatuses 205A to 205C, only a portion (such as an inverter) for supplying electric power to the motors 207A to 207C is mounted by an actual device, and the other functions of each processing unit may be mounted by a program executed by a CPU901 (see FIG. 13) described later, or a part or all of the functions may be mounted by an actual device such as an ASIC, an FPGA, or other electric circuit.

(3-3. Processing Procedure of Motor Control Apparatus)

Figure 12:
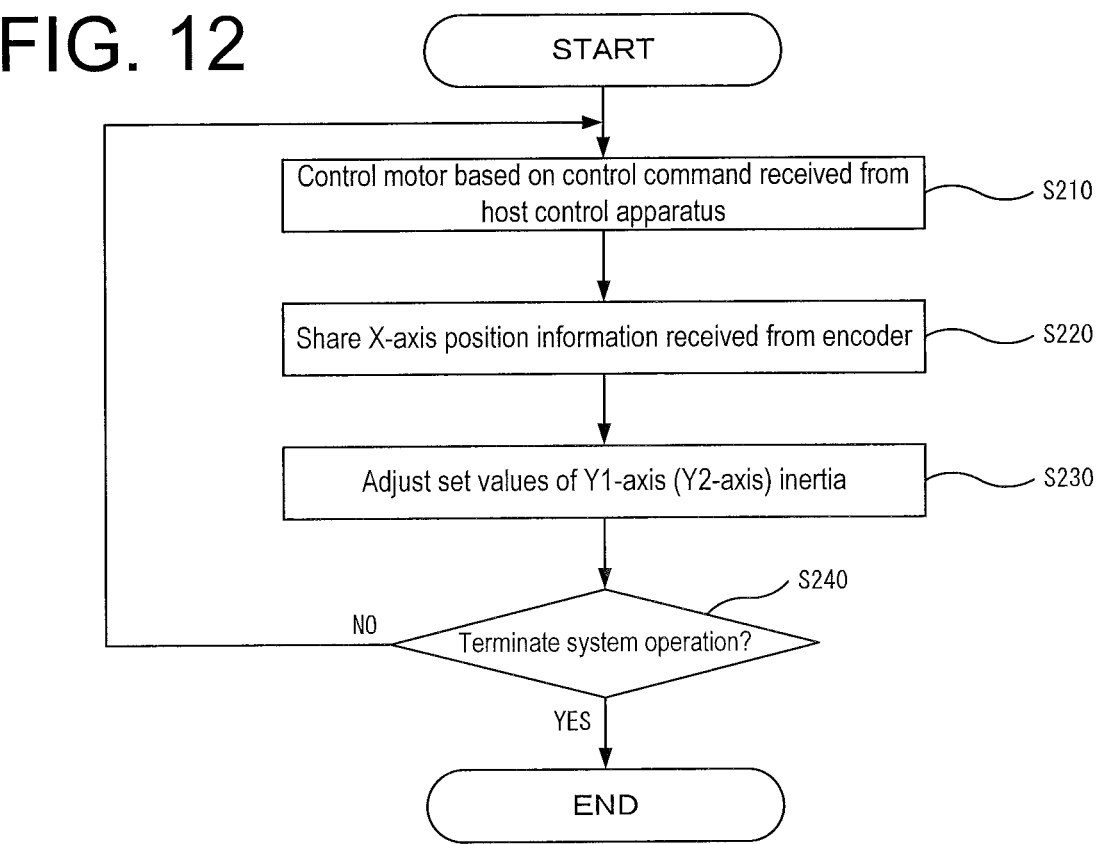
FIG. 12 is a flowchart showing an example of a processing procedure executed by the motor control apparatus.

An example of a processing procedure executed by the motor control apparatuses 205A and 205B will be described with reference to FIG. 12.

In step 210, the motor control apparatuses 205A and 205B control the motors 207A and 207B by the motor control unit 227 based on the control command received from the host control apparatus 203 and the position information received from the encoders 213A and 213B.

In step 220, the motor control apparatuses 205A and 205B share the X-axis position information received by the motor control apparatus 205C from the encoder 213C with each other via the data communication via the second communication path 11 by the information sharing unit 223. Specifically, the information sharing unit 223 of the motor control apparatus 205C shares the X-axis position information received from the encoder 213C and transmits it to the other motor control apparatuses 205A and 205B, respectively. The motor control apparatuses 205A and 205B acquire shared X-axis position information by the information sharing unit 223 through data communication via the second communication path 11.

In step S230, the motor control apparatuses 205A and 205B use the parameter adjustment unit 225 to adjust the set values of the inertias related to the control of the motors 207A and 207B to be controlled based on the position information of the X-axis shared in step S220.

In step 240, the motor control apparatuses 205A and 205B determine whether or not to terminate the operation of the motor control system 200. If the operation of the system is to be continued (step S240: NO), the process returns to step S210 and the same procedure is repeated. On the other hand, when the operation of the system is to be terminated (step S240: YES), this flowchart is terminated.

The processing procedure described above is an example, and at least a part of the above procedure may be deleted or changed, or other procedures may be added. Further, the order of at least a part of the above-described procedures may be changed, or a plurality of procedures may be combined into a single procedure.

(3-4. Effects of Third Embodiment)

As described above, a motor control system 200 according to a third embodiment includes a host control apparatus 203 which outputs a control command, a plurality of motor control apparatuses 205A to 205C which control a plurality of motors 207A to 207C based on the control command, and encoders 213A to 213C which detect position information of a movable part of the motors 207A to 207C and output the position information to the corresponding motor control apparatuses 205A to 205C, each of the plurality of motor control apparatuses 205A to 205C includes an information sharing unit 223 which shares the position information detected by the encoder 213C with each other through data communication between the plurality of motor control apparatuses 205A to 205C, and the motor control apparatuses 205A, 205B include a parameter adjustment unit 225 which adjusts a control parameter relating to the control of the motors 207A, 207B to be controlled based on the shared position information, and a motor control unit 227 which controls the motors 207A, 207B to be controlled based on the control command and the adjusted control parameter.

In general, in the motor control system for controlling a plurality of axes, depending on the structure of the drive mechanism, the control parameter of one axis may change under the influence of the position of another axis. In this case, it is general that the host control apparatus monitors the position of each axis and adjusts the control parameters according to the position, but this causes an increase in the processing load of the host control apparatus.

In the motor control system 200 of this embodiment, the encoder 213C detects the position information of the movable part of the motor 207C and outputs it to the corresponding motor control apparatus 205C. Each of the motor control apparatuses 205A and 205B shares X-axis position information detected by the encoder 213C through data communication. The motor control apparatuses 205A and 205B adjust control parameters related to control of the motors 207A and 207B which are control targets based on the shared position information, and control the motors 207A and 207B which are control targets based on the control command and the adjusted control parameters. In this way, each of the motor control apparatuses 205A and 205B can share not only the position information of the motors 207A and 207B which are controlled by itself but also the position information of the other motors 207C, so that each of the motor control apparatuses 205A and 205B can independently adjust the control parameters without processing by the host control apparatus 203. Therefore, it is possible to realize control in which the control parameters are compensated by the motor control apparatus 5A alone. As a result, the host control apparatus 203 does not need to acquire the position information from the motor control apparatus 205C and adjust the control parameters of the motor control apparatuses 205A and 205B, so that the processing load of the host control apparatus 203 can be reduced.

In the present embodiment, a plurality of motor control apparatuses 205A to 205C include a motor control apparatus 205A and a motor control apparatus 207B for controlling each of the motors 207A, 207B arranged substantially parallel to the Y-axis direction, and a motor control apparatus 205C for controlling a motor 207C arranged substantially perpendicular to the Y-axis direction so as to pass between the movable parts of the motors 205A, 207B, an encoder 213C detects position information of the movable part of the motor 207C and outputs it to the motor control apparatus 205C, each of the motor control apparatuses 205A, 205B adjusts, by a parameter adjustment unit 225, control parameters relating to the control of the motors 207A, 207B based on the shared position information of the motor 207C, and the motor control unit 227 controls the motors 207A, 207B based on the control command and the adjusted control parameters.

In general, in a gantry mechanism, control parameters of the gantry axes Y1 and Y2 axes are changed under the influence of the position of the head axis (X axis). In this embodiment, each of the motor control apparatuses 205A and 205B corresponding to the gantry axes (Y1 and Y2 axes) shares position information of the motor 207C corresponding to the head axis X-axis, and adjusts control parameters related to the control of the motors 207A and 207B to be controlled based on the shared position information. As a result, in the motor control system 200 for controlling the gantry mechanism, it is possible to realize control in which the control parameter based on the head position of the gantry is compensated by the motor control apparatuses 205A and 205B alone.

In the present embodiment, the parameter adjustment unit 225 may adjust the set value of inertia relating to the control of the motors 207A and 207B based on the shared position information of the motor 207C, and the motor control unit 227 may control the motors 207A and 207B based on the adjusted set value of inertia.

In this case, in the motor control system 200 for controlling the gantry mechanism, the motor control apparatuses 205A and 205B alone can realize the inertia compensation control based on the head position of the gantry.

4. Hardware Configuration Example of Motor Control Apparatus

Figure 13:
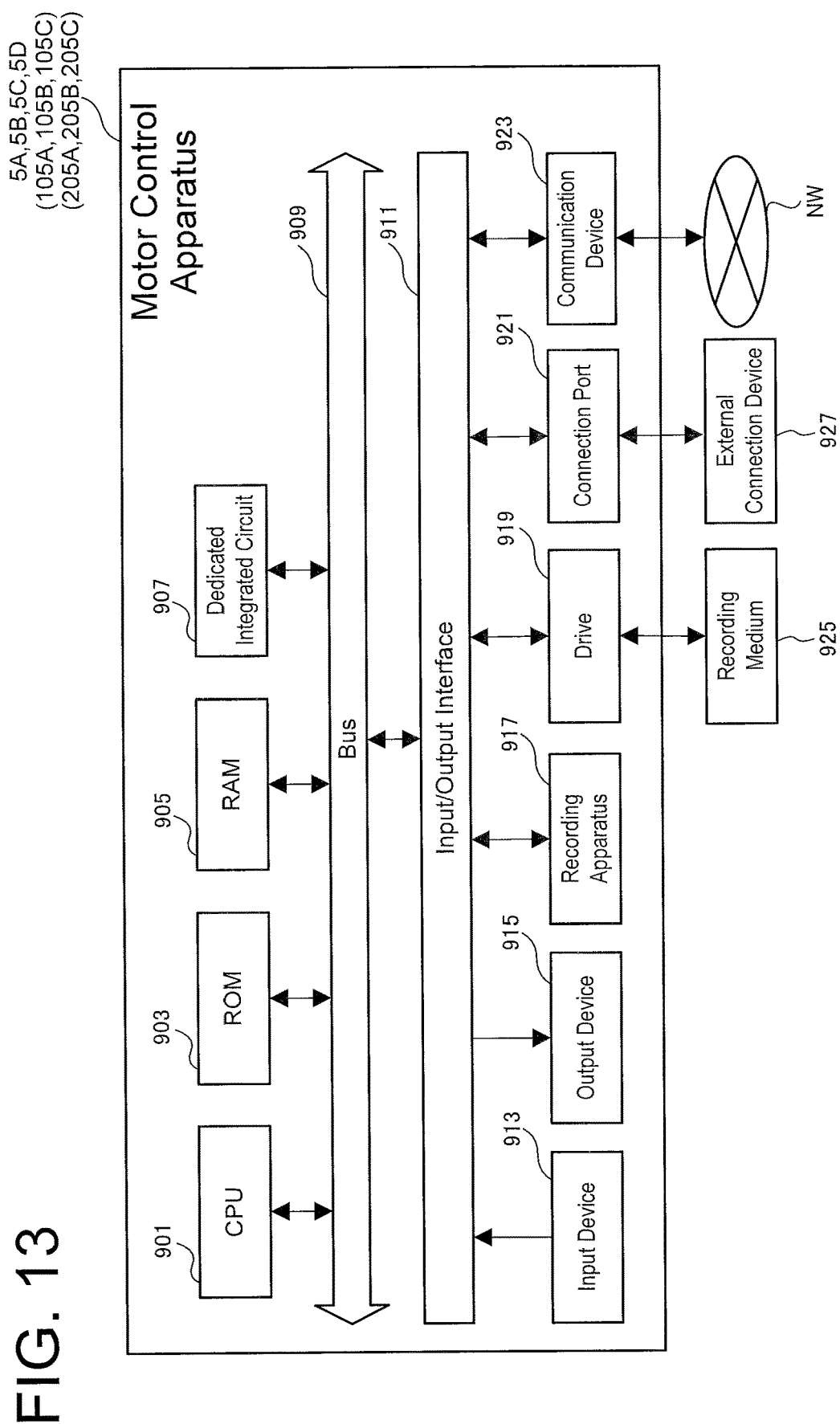
FIG. 13 is a block diagram showing an example of a hardware configuration of a motor control apparatus.

Referring to FIG. 13, an example of a hardware configuration of the motor control apparatuses 5A to 5D (105A to 105C, 205A to 205C) described in each of the above embodiments will be described. In FIG. 13, the configuration relating to the function of supplying electric power to the motor of the motor control apparatus 5A is appropriately omitted.

As shown in FIG. 13, the motor control apparatuses 5A to 5D (105A to 105C, 205A to 205C) include, for example, a CPU901, a ROM903, a RAM905, a dedicated integrated circuit 907 constructed for a specific application such as an ASIC or an FPGA, an input device 913, an output device 915, a recording apparatus 917, a drive 919, a connection port 921, and a communication device 923. These components are connected to each other through a bus 909 and an input/output interface 911 so that signals can be transmitted to each other.

The program can be recorded in, for example, a recording apparatus 917 such as a ROM903, a RAM905, or a hard disk.

The program may be temporarily or non-temporarily (permanently) recorded on, for example, a magnetic disk such as a flexible disk, an optical disk such as various CD, MO, and DVD, and a removable recording medium 925 such as a semiconductor memory. Such a recording medium 925 can also be provided as so-called package software. In this case, the program recorded on the recording medium 925 may be read out by the drive 919 and recorded in the recording apparatus 917 via the input/output interface 911, the bus 909, or the like.

The program may be recorded in, for example, a download site, another computer, another recording apparatus, or the like (not illustrated). In this case, the program is transferred via a network NW such as a LAN or the Internet, and the communication device 923 receives the program. The program received by the communication device 923 may be recorded in the recording apparatus 917 via the input/output interface 911, the bus 909, or the like.

For example, the program may be recorded in an appropriate external connection device 927. In this case, the program may be transferred through an appropriate connection port 921 and recorded in the recording apparatus 917 through an input/output interface 911, a bus 909, or the like.

By the CPU901 executing various processes according to the program recorded in the recording apparatus 917, the processes by the information sharing unit 23, the command conversion unit 25, the motor control unit 27, the information sharing unit 123, the reaching determination unit 125, the motor control unit 127, the trigger output unit 129, the information sharing unit 223, the parameter adjustment unit 225, and the motor control unit 227 are realized. For example, the CPU901 may directly read and execute the program from the recording apparatus 917, or may execute the program after loading it into the RAM905. For example, when the CPU901 receives a program via the communication device 923, the drive 919, or the connection port 921, it may directly execute the received program without recording it in the recording apparatus 917.

The CPU901 may perform various types of processing based on signals and information input from an input device 913 such as a mouse, keyboard, and microphone (not shown), as needed.

The CPU901 may output the result of execution of the above processing from an output device 915 such as a display device or an audio output device. The CPU901 may transmit the processing result through the communication device 923 or the connection port 921 as necessary. The CPU901 may record the processing result in the recording apparatus 917 or the recording medium 925.

In the above description, when there are descriptions such as "vertical", "parallel" and "plane", these descriptions are not strictly defined. The terms "perpendicular," "parallel," and "plane" mean "substantially perpendicular," "substantially parallel," and "substantially plane," where tolerances and errors in design and manufacturing are allowed.

In the above description, when there are descriptions such as "identical", "same", "equal", "different" in terms of dimensions, size, shape, position, etc. in appearance, these descriptions are not strictly defined. The terms "identical", "same", "equal", and "different" mean "substantially identical", "substantially same", "substantially equal", and "substantially different", while tolerances and errors in design and manufacturing are allowed.

For example, in the case where there is a description of a threshold value, a reference value, or a value serving as a predetermined criterion or a threshold, the terms "same", "equal", "different" and the like are different from the above and have strict meanings.

In addition to what has already been described above, techniques according to the above-described embodiments and various modifications may be used in combination as appropriate. In addition, although not illustrated individually, various modifications may be made to the above-described embodiments and modifications without departing from the spirit thereof.

The problems and effects to be solved by the above-described embodiments and modifications are not limited to the above-described contents. According to embodiments, modifications, and the like, problems not described above can be solved or effects not described above can be produced, and only a part of the problems described may be solved or only a part of the effects described may be produced.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A motor control system comprising:
host control circuitry configured to generate a first control command;
a plurality of motor control apparatuses configured to control a plurality of motors, respectively, based on the first control command;
a sensor configured to detect position information of a mechanism element to be driven by one motor among the plurality of motors and configured to output the position information to one motor control apparatus among the plurality of motor control apparatuses which is configured to control the one motor among the plurality of motors; and
each of the plurality of motor control apparatuses corresponding to a corresponding motor among the plurality of motors and comprising:
information sharing circuitry configured to share the position information among the plurality of motor control apparatuses via data communication while the plurality of motor control apparatuses controls the plurality of motors, respectively, based on the first control command;
command conversion circuitry configured to convert the position information into a second control command based on correlation information between the position information and a position command to the corresponding motor; and
motor control circuitry configured to control the corresponding motor based on the second control command.

2. The motor control system according to claim 1, wherein the sensor is configured to detect position information of a movable part of the one motor among the plurality of motors.

3. The motor control system according to claim 1,
wherein the host control circuitry comprises start command output circuitry that is configured to output a start command to the plurality of motor control apparatuses, and
wherein each of the plurality of motor control apparatuses controls the corresponding motor based on the second control command when receiving the start command.

4. The motor control system according to claim 1, wherein the sensor is configured to detect position information of a movable part of a motor among the plurality of motors.

5. A motor control system comprising:
host control circuitry configured to generate a control command;
a plurality of motor control apparatuses configured to control a plurality of motors, respectively, based on the control command;
a plurality of sensors each of which is configured to detect position information of a movable part of each of the plurality of motors to output the position information to each of the plurality of motor control apparatuses;
each of the plurality of motor control apparatuses comprising information sharing circuitry configured to share the position information among the plurality of motor control apparatuses via data communication; and
at least one of the plurality of motor control apparatuses comprising:
reaching determination circuitry configured to determine whether a reference point of a drive machine driven by the plurality of motors reaches a predetermined position based on the position information; and
a trigger output circuitry configured to output a trigger signal when it is determined that the reference point has reached the predetermined position.

6. The motor control system according to claim 5,
wherein the reaching determination circuitry comprises:
reaching time calculation circuitry configured to calculate a reaching time at which the reference point reaches the predetermined position based on the position information; and
elapsing time calculation circuitry configured to determine whether the reaching time has elapsed, and
wherein the trigger output circuitry is configured to output the trigger signal when it is determined that the reaching time has elapsed.

7. The motor control system according to claim 5,
wherein the plurality of motor control apparatuses comprises
an X-axis motor control apparatus configured to control an X-axis motor corresponding to an X-axis in a three dimensional orthogonal coordinate system,
a Y-axis motor control apparatus configured to control a Y-axis motor corresponding to a Y-axis in the three dimensional orthogonal coordinate system,
a Z-axis motor control apparatus configured to control a Z-axis motor corresponding to a Z-axis in the three dimensional orthogonal coordinate system,
wherein the information sharing circuitry shares the position information of the X-axis, the Y-axis, and the Z-axis detected by the plurality of sensors, and
wherein the reaching determination circuitry determines whether the reference point has reached the predetermined position in the three dimensional orthogonal coordinate system based on the position information of the X-axis, Y-axis and Z-axis.

8. A motor control system comprising:
host control circuitry configured to generate a control command;
a plurality of motor control apparatuses configured to control a plurality of motors, respectively, based on the control command;
at least one sensor configured to detect position information of a movable part of at least one motor among the plurality of motors and output the position information to a corresponding motor control apparatus among the plurality of motor control apparatuses;
each of the plurality of motor control apparatuses comprising information sharing circuitry configured to share the position information among the plurality of motor control apparatuses via data communication; and
at least one of the plurality of motor control apparatuses comprising:
parameter adjustment circuitry configured to adjust control parameters relating to control of a corresponding motor among the plurality of the motors; and motor control circuitry configured to control the corresponding motor based on the control command and the adjusted control parameter.

9. The motor control system according to claim 8, wherein the plurality of motor control apparatuses comprises:
a first motor control apparatus configured to control a first motor which is arranged substantially in parallel to a first axial direction;
a second motor control apparatus configured to control a second motor which is arranged substantially in parallel to the first axial direction; and
a third motor control apparatus configured to control a third motor which is arranged along a second axial direction substantially perpendicular to the first axial direction and which is provided over the movable parts of the first motor and the second motor,
wherein the at least one sensor includes a sensor that is configured to detect the position information of the movable part of the third motor and output the position information to the third motor control apparatus, and
wherein each of the first motor control apparatus and the second motor control apparatus are configured to adjust the control parameter relating to control of the first motor or the second motor by the parameter adjustment circuitry based on the position information of the third motor, and controls the first motor or the second motor by the motor control circuitry based on the control command and the adjusted control parameter.

10. The motor control system according to claim 9, wherein the parameter adjustment circuitry is configured to adjust a set value of an inertia relating to control of the first motor or the second motor based on the position information of the third motor, and
wherein the motor control circuitry is configured to control the first motor or the second motor based on the adjusted set value of the inertia.

11. A motor control apparatus configured to control one of a plurality of motors based on a first control command output from host control circuitry, comprising:
information sharing circuitry configured to share position information with another motor control apparatus via data communication while the motor control apparatus controls the one of the plurality of motors, respectively, based on the first control command, the position information relating to control of the plurality of motors;
command conversion circuitry configured to convert the position information into a second control command based on correlation information between the position information and a position command to the one of the plurality of motors; and
motor control circuitry configured to control the one of the plurality of the plurality of motors based on the second control command.

12. A motor control apparatus configured to control one of a plurality of motors based on a control command output from host control circuitry, comprising:
information sharing circuitry configured to share position information with another motor control apparatus via data communication, the position information being detected by a sensor which is configured to detect the position information of a movable part of another motor among the plurality of motors and to output the position information to the another motor control apparatus;
reaching determination circuitry configured to determine whether a reference point of a drive machine driven by the plurality of motors reaches a predetermined position based on the position information; and
trigger output circuitry configured to output a trigger signal when it is determined that the reference point has reached the predetermined position.

13. A motor control apparatus configured to control a motor among a plurality of motors based on a control command output from host control circuitry, comprising:
information sharing circuitry configured to share position information with another motor control apparatus via data communication, the position information being detected by a sensor which is configured to detect the position information of a movable part of another motor among the plurality of motors and to output the position information to the another motor control apparatus;
parameter adjustment circuitry configured to adjust, based on the position information, control parameters relating to control of the motor; and
motor control circuitry configured to control the motor based on the control command and the control parameters adjusted by the parameter adjustment circuitry.

14. A motor control method for controlling a plurality of motors based on a first control command output from host control circuitry, comprising:
sharing position information, via data communication, among a plurality of motor control apparatuses while the plurality of motor control apparatuses controls the plurality of motors, respectively, based on the first control command, the position information relating to control of the plurality of motors;
converting the position information into a second control command for a motor among the plurality of motors based on correlation information between the position information and a position command to the motor; and
controlling the motor based on the second control command.

15. A motor control method for controlling a motor among a plurality of motors based on a control command output from host control circuitry, comprising:
detecting position information of a movable part of another motor among the plurality of motors;
outputting the position information to another motor control apparatus which is configured to control the another motor;
sharing the position information, via data communication, with a motor control apparatus which is configured to control the motor;
determining whether a reference point of a drive machine driven by the plurality of motors reaches a predetermined position based on the position information; and
outputting a trigger signal when it is determined that the reference point has reached the predetermined position.

16. A motor control method for controlling a motor among a plurality of motors based on a control command output from host control circuitry, comprising:
detecting position information of a movable part of another motor among the plurality of motors;
outputting the position information to another motor control apparatus which is configured to control the another motor;
sharing the position information, via data communication, with a motor control apparatus which is configured to control the motor while the motor control apparatus and the another motor control apparatus control the motor and the another motor, respectively, based on the control command output from host control circuitry;

adjusting, based on the position information, control parameters relating to control of the motor; and controlling the motor based on the control command and the control parameters adjusted.

\* \* \* \* \*